US008290936B2

(12) United States Patent
Day et al.

(10) Patent No.: US 8,290,936 B2
(45) Date of Patent: Oct. 16, 2012

(54) EXECUTING A QUERY PLAN WITH DISPLAY OF INTERMEDIATE RESULTS

(75) Inventors: Paul R. Day, Rochester, MN (US); Randy L. Egan, Rochester, MN (US); Roger A. Mittelstadt, Byron, MN (US); Brian R. Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 12/857,873

(22) Filed: Aug. 17, 2010

(65) Prior Publication Data

US 2012/0047125 A1    Feb. 23, 2012

(51) Int. Cl.
*G06F 17/30* (2006.01)
*G06F 7/00* (2006.01)
(52) U.S. Cl. ......................................... 707/718; 707/714
(58) Field of Classification Search .................. None
See application file for complete search history.

(56) References Cited

U.S. PATENT DOCUMENTS 6,757,670 B1 * 6/2004 Inohara et al. .................... 1/1
7,185,000 B1 * 2/2007 Brown et al. ................. 707/718
2003/0065648 A1 * 4/2003 Driesch et al. .................... 707/2
2009/0327252 A1 * 12/2009 Zhang et al. ..................... 707/4
2010/0318559 A1 * 12/2010 Yan et al. ...................... 707/769

OTHER PUBLICATIONS

Ying Hu, Seema Sundara, Jagannathan Srinivasan, "Supporting Time-Constrained SQL Queries in Oracle," VLDB '07, Sep. 23-28, 2007, pp. 1207-1218, VLDB Endowment, ACM, Vienna, Austria.

* cited by examiner

*Primary Examiner* — Tarek Chbouki
(74) *Attorney, Agent, or Firm* — Owen J. Gamon

(57) ABSTRACT

In an embodiment, a FIRSTIO execution plan is selected that has a lowest estimated execution time for finding a number of records that satisfy the query and are simultaneously viewable. An ALLIO execution plan is selected that has a lowest estimated execution time for finding all records that satisfy the query. The FIRSTIO execution plan is executed for a first time period to create a FIRSTIO result set. The ALLIO execution plan is executed for a second time period to create an ALLIO result set. The FIRSTIO result set is displayed if the FIRSTIO result set comprises more records than the ALLIO result set. The ALLIO result set is displayed if the ALLIO result set comprises more records than the FIRSTIO result set. In an embodiment, the first and second time periods expire in response to the expiration of a maximum time specified by the query.

16 Claims, 13 Drawing Sheets

EXECUTING A QUERY PLAN WITH DISPLAY OF INTERMEDIATE RESULTS

FIELD

An embodiment of the invention generally relates to computer systems and more particularly to database management systems that execute queries.

BACKGROUND

Computer systems typically comprise a combination of computer programs and hardware, such as semiconductors, transistors, chips, circuit boards, storage devices, and processors. The computer programs are stored in the storage devices and are executed by the processors. Fundamentally, computer systems are used for the storage, manipulation, and analysis of data. One mechanism for managing data is called a database management system (DBMS), which may also be called a database system or simply a database.

A relational database (RDB) organizes data in tables that have rows, which represent individual entries, tuples, or records in the database, and columns, fields, or attributes, which define what is stored in each row, entry, tuple, or record. Each table has a unique name within the database and each column has a unique name within the particular table. The database also has one or more indexes, which is a data structure that informs the DBMS of the location of a certain record in a table given an indexed column value, analogous to a book index informing the reader on which page a given word appears. The database accesses the data in a record via a key. A key specifies the name of a column and a data value that exists in one of the records in that column.

The most common way to retrieve data from a database is through queries, which may originate from user interfaces, application programs, or remote computer systems, such as clients. A query is an expression evaluated by the DBMS, in order to retrieve data from the database that satisfies or meets the criteria or conditions specified in the query. Although the query requires the return of a particular data set in response, the method of query execution is typically not specified by the query. Thus, after the DBMS receives a query, the DBMS interprets the query and determines what internal steps are necessary to satisfy the query. These internal steps may comprise an identification of the table or tables specified in the query, the record or records selected in the query, and other information such as whether to use an existing index, whether to build a temporary index, whether to scan a table instead of randomly accessing the table via an index, whether to use a temporary file to execute a sort, and/or the order in which the tables are to be joined together to satisfy the query.

When taken together, these internal steps are referred to as an execution plan or a query plan. The DBMS often saves the execution plan for later use. Then, when the user or program object repeats the same query, the DBMS finds, reuses, and re-executes the saved execution plan instead of undergoing the time-consuming process of recreation.

Many different execution plans may be created for any one query, each of which would return the same data set that satisfies the query, yet the different execution plans may provide widely different performance. Hence, the query optimizer often creates multiple prospective execution plans and then chooses the best, fastest, or least expensive one to execute.

SUMMARY

A method, computer-readable storage medium, and computer system are provided. In an embodiment, a FIRSTIO execution plan is selected that has a lowest estimated execution time for finding a number of records that satisfy the query and are simultaneously viewable. An ALLIO execution plan is selected that has a lowest estimated execution time for finding all records that satisfy the query. The FIRSTIO execution plan is executed for a first time period to create a FIRSTIO result set. The ALLIO execution plan is executed for a second time period to create an ALLIO result set. The FIRSTIO result set is displayed if the FIRSTIO result set comprises more records than the ALLIO result set. The ALLIO result set is displayed if the ALLIO result set comprises more records than the FIRSTIO result set.

The appended drawings illustrate only example embodiments of the invention, and are not considered a limitation of the scope of other embodiments of the invention.

DETAILED DESCRIPTION

Figure 1:
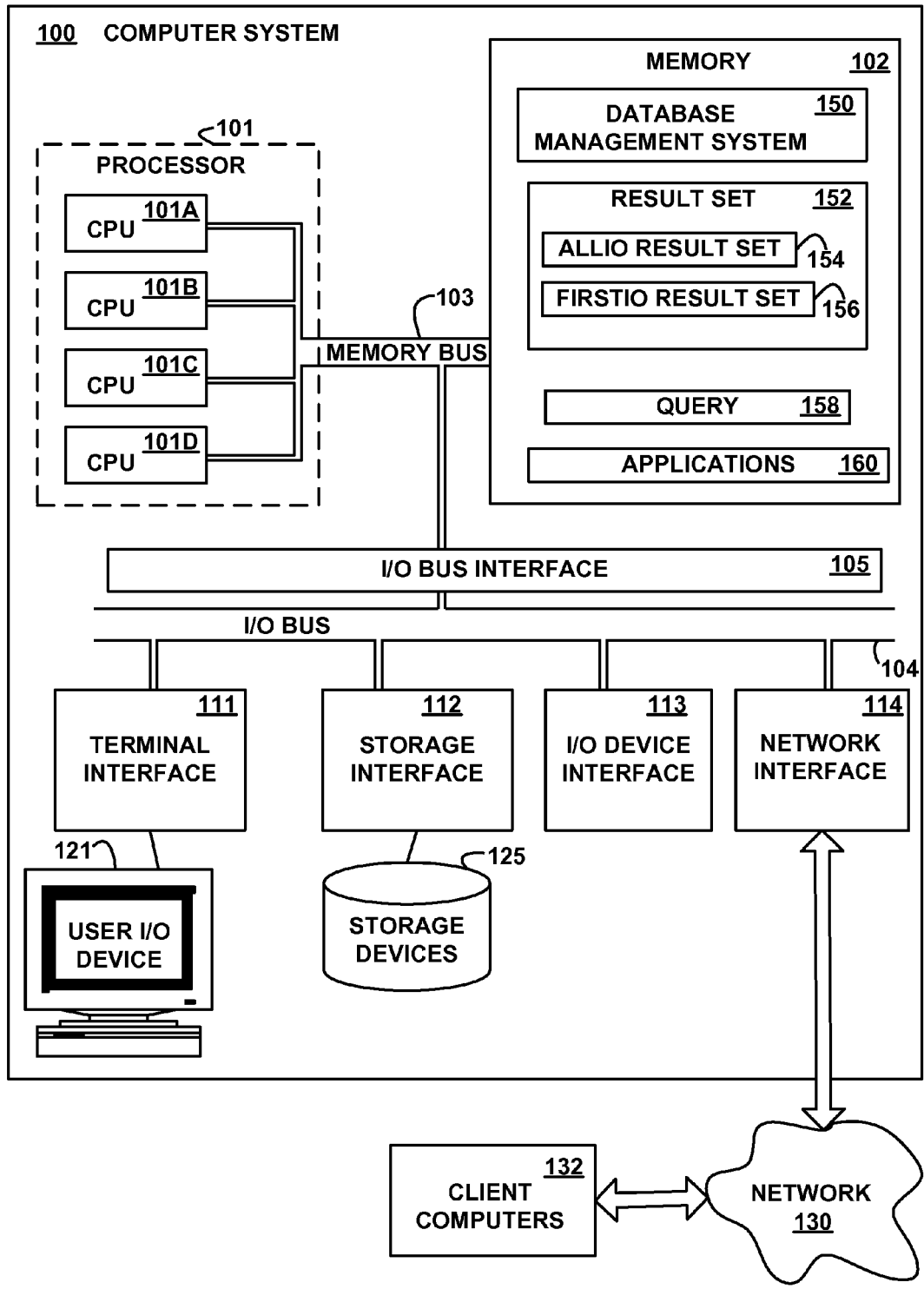
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected to client computer systems 132 via a network 130, according to an embodiment of the invention. The major components of the computer system 100 include one or more processors 101, memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the memory 102 and may include one or more levels of on-board cache.

The memory 102 may be a random-access semiconductor memory, storage device, or storage medium for storing or encoding data and programs. In another embodiment, the memory 102 may represent the entire virtual memory of the computer system 100, and may also include the virtual memory of other computer systems coupled to the computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed across different CPUs or sets of CPUs, as is known in any of various so-called non-uniform memory access (NUMA) computer architectures.

The memory 102 stores or encodes a database management system (DBMS) 150, a result set 152, a query 158, and applications 160. Although the DBMS 150, the result set 152, the query 158, and the applications 160 are illustrated as being contained within the memory 102 in the computer system 100, in other embodiments some or all of them may be on different computer systems (e.g., the client computers 132) and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the DBMS 150, the result set 152, the query 158, and the applications 160 are illustrated as being contained within the memory 102, these elements are not necessarily all completely contained in the same storage device at the same time. Further, although the DBMS 150, the result set 152, the query 158, and the applications 160 are illustrated as being separate entities, in other embodiments some of them, portions of some of them, or all of them may be packaged together.

In various embodiments, the DBMS 150 and the applications 160 comprise programs, methods, procedures, routines, classes, objects, instructions, or statements that execute on the processor 101 or that are interpreted by instructions or statements that execute on the processor 101, to carry out the functions as further described below with reference to FIGS. 2, 3, 4, 5, 6, 7, 8, 9, 10, 11, 12, and 13. In other embodiments, the DBMS 150 and/or the applications 160 are implemented in hardware via semiconductor devices, chips, logical gates, circuits, circuit cards, and/or other physical hardware devices in lieu of, or in addition to, a processor-based system.

The application 160 sends the query 158 to the DBMS 150, which requests that the DBMS 150 search for or find a record or combination of records of data that meet or satisfy the criteria, keys, and or values specified by the query 158 and store the data from those found records into the result set 152. In an embodiment, the application 160 sends the same query 158 multiple times to the DBMS 150, which may or may not result in a different result set 152, depending on whether the data in the DBMS 150 has changed between occurrences of the query 158. The DBMS 150 receives the query 158 from the application 160 and, in response, creates or stores data into the result set 152 that satisfies or meets the search criteria specified by the query 158.

In various embodiments, the result set 152 comprises one or both of an ALLIO result set 154 and/or a FIRSTIO result set 156. The DBMS 150 creates the ALLIO result set 154 using an ALLIO execution plan. The DBMS 150 creates the FIRSTIO result set 156 by using a FIRSTIO execution plan.

If the DBMS 150 executes the query 158 against the same data in the same database tables using both the FIRSTIO execution plan and the ALLIO execution plan and performs the query 158 to completion using both execution plans, then the ALLIO result set 154 and the FIRSTIO result set 156 comprise identical result data. Whether the ALLIO or the FIRSTIO execution plan performs better is dependent on many factors, such as the number of records in the database tables, the number of records in the tables that satisfy the search criteria of the query 158, and whether or not the query 158 requests only partial results, such as only a first page or screen full of result data or only the amount of data that the DBMS 150 can find within a maximum specified time.

The memory bus 103 provides a data communication path for transferring data between the processor 101, the memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user input/output devices 121, which may include user output devices (such as a video display device, speaker, printer, and/or television set) and user input devices (such as a keyboard, mouse, keypad, touchpad, trackball, buttons, light pen, or other pointing device). A user may manipulate the user input devices, in order to provide input to the user input/output device 121 and the computer system 100 via a user interface, and may receive output via the user output devices. For example, a user interface may be presented via the user input/output device 121, such as displayed on a display device, played via a speaker, or printed via a printer.

The storage interface unit 112 supports the attachment of one or more direct access storage devices 125 (which are typically rotating magnetic disk drive storage devices, although they could alternatively be other devices, including arrays of disk drives configured to appear as a single large storage device to a host). In another embodiment, the storage devices 125 may be implemented via any type of secondary storage device. The contents of the memory 102, or any portion thereof, may be stored to and retrieved from the storage devices 125, as needed. The I/O device interface 113 provides an interface to any of various other input/output devices or devices of other types, such as printers or fax machines. The network adapter 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path between the processors 101, the memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 may be a multi-user mainframe computer system, a single-user system, or a server or similar device that has little or no direct user interface, but receives requests from other computer systems (clients). In other embodiments, the computer system 100 may be implemented as a desktop computer, portable computer, laptop or notebook computer, tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support wireless communications. In another embodiment, the network 130 may support hard-wired communications, such as a telephone line or cable. In an embodiment, the network 130 may be the Internet and may support IP (Internet Protocol). In various embodiments, the network 130 may be a local area network (LAN), a wide area network (WAN), a hotspot service provider network, an intranet, a GPRS (General Packet Radio Service) network, a FRS (Family Radio Service) network, a cellular data network, or a cell-based radio network. Although one network 130 is shown, in other embodiments any number of networks (of the same or different types) may be present.

The client computers 132 may comprise various combinations of some or all of the hardware and program components of the computer system 100. In various embodiments, some or all of the client computers 132 send the query 158 to the computer system 100 and, in response, receive the result set 152.

FIG. 1 is intended to depict the representative major components of the computer system 100 and the network 130. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations.

The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention.

Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks. The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the present invention may also be delivered as part of a service agreement with a client company, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature.

The exemplary environments illustrated in FIG. 1 are not intended to limit the present invention. Indeed, other alternative hardware and/or program environments may be used without departing from the scope of embodiments the invention.

Figure 2:
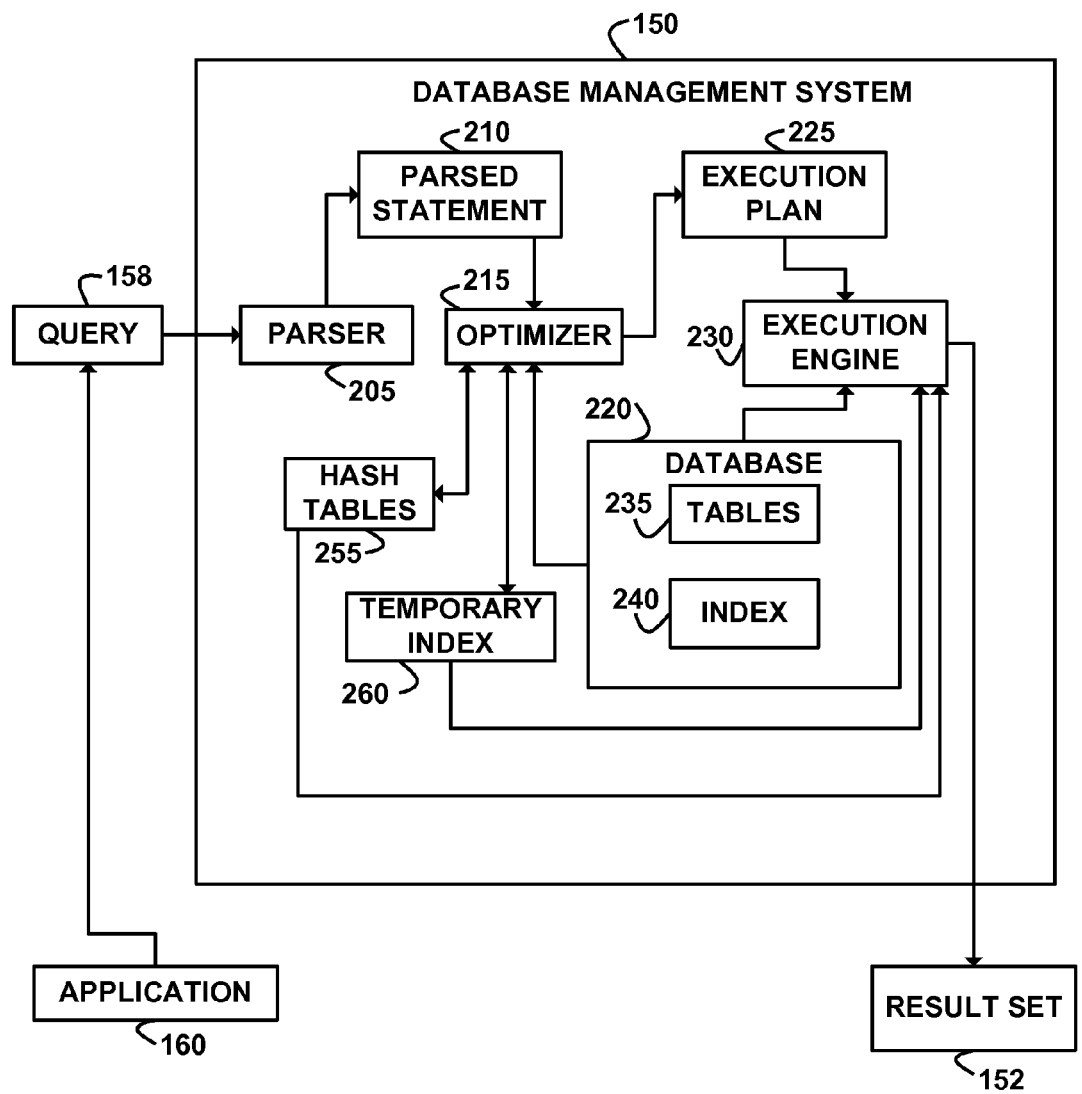
FIG. 2 depicts a block diagram of an example database management system, according to an embodiment of the invention.

FIG. 2 depicts a block diagram of an example database management system, according to an embodiment of the invention. The DBMS 150 comprises a parser 205, an optimizer 215, an execution engine 230 and a database 220. The parser 205 receives the query 158 from the application 160 and generates a parsed statement 210 therefrom, which the parser 205 sends to the optimizer 215. The optimizer 215 performs query optimization on the parsed statement 210. As a result of query optimization, the optimizer generates the execution plan 225, using data such as platform capabilities, query content information, etc., that is stored in the database 220. In an embodiment, the optimizer 215 creates the hash tables 255 and the temporary indexes 260 as a performance aid to the execution of the query by the execution engine 230. Once generated, the optimizer 215 sends the execution plan 225 to the execution engine 230, which executes the query 158 by executing the execution plan 225, in order to find and retrieve the data in the database tables 235 in the database 220 that satisfies the criteria of the query 158. The execution engine 230 stores the resultant data that satisfies the criteria specified by the query 158 into the result set 152, which the DBMS 150 returns to the application 160, as a response to the query 158.

The database tables 235 organizes data in rows, which represent individual entries, tuples, or records in the database, and columns, fields, or attributes, which define what is stored in each entry, tuple, or record. Each table 235 has a unique name within the database and each column has a unique name within the particular table. The database also has one or more indexes 240, which is a data structure that informs the DBMS 150 of the location of a certain record in a table 235 given an indexed column value. The execution engine 230 may use the one or more indexes 240 to probe data from the tables 235 and/or may scan the tables 235 without using the index 240.

The execution plans 225 may comprise a FIRSTIO execution plan, an ALLIO execution plan, or both. In creating a FIRSTIO execution plan, the query optimizer 215 does not consider the performance of retrieving all records that satisfy the query 158, but instead considers the performance of retrieving the number of records that both satisfy the query 158 and that can be simultaneously displayed or viewed in one window of a display screen of the user I/O device 121. The query optimizer 215 estimates the performance (estimated execution time) for multiple execution plans and selects the FIRSTIO execution plan from the multiple execution plans that has the best estimated performance or lowest estimated time of execution for finding the number of records that both satisfy the query and that can be simultaneously displayed or viewed in one window. In various embodiments, the query optimizer 215 may calculate the estimated times using such factors as the number of records in the tables, the cardinality of the keys of the query 158, the cardinality of tables with respect to each other, or any other appropriate factors.

The window is a visual area of a display screen that displays the result set generated by execution of the query. In an embodiment, the number of records that can be simultaneously displayed or viewed is a default or predetermined number that is set by the query optimizer 215 or input by a database administrator or another program. In another embodiment, the query optimizer 215 reads, via an operating system, the number of bytes the result set window is able to receive, the number of characters the window is able to receive, the number of displayable lines in the window, and/or the font size of characters in the window. The optimizer 215 further determines the size of a displayed record from the number of bytes or characters in a record by determining the columns or fields that the query 158 requests to be displayed and by determining the column or field size from the database 220. The query optimizer 215 then adjusts the number of records that be simultaneously displayed or viewed in one window by adjusting the number of characters or bytes for readability in view of the line spacing, font size, column or field size, and top/bottom/right/left margins in the window.

In an embodiment, the FIRSTIO execution plan specifies a technique of probing records from each database table, or from the first database table in a join order, using an index to randomly access the table. In another embodiment, the FIRSTIO execution plans specifies any appropriate technique, either scanning, probing, or a combination thereof. In a probe operation, the optimizer 215 retrieves a record from a table via a random access operation using the index 240 and a key or column value into the index 240 to indirectly retrieve the indexed record from the table, without needing to scan all records in the table from beginning to end.

In creating the ALLIO execution plan, the query optimizer 215 considers the performance of retrieving all of the records that satisfy the query 158, which in an embodiment is more than the number of records simultaneously displayable or viewable in one window. In creating the ALLIO execution plan, the query optimizer 215 does not consider the performance of retrieving the number of records that are simultaneously displayable or viewable in one window. The query optimizer 215 estimates the performance (estimated execution time) for multiple execution plans and selects the ALLIO execution plan from the multiple execution plans that has the best estimated performance or lowest estimated execution time for all records that satisfy the query 158.

In an embodiment, an ALLIO execution plan specifies the scanning of the first table in the join order, and all other tables in the join order may be either scanned or probed. In another embodiment, an ALLIO execution plan specifies the scanning of all tables in the join order, and no tables are probed. In another embodiment, the ALLIO execution plan specifies any appropriate technique, either scanning, probing, or a combination thereof. Scan operations read all records from the beginning to the end of a table in record order, i.e., in the order that the records are stored in the table in memory. Thus, the scan reads records non-randomly, without using the index 240 to randomly access the table. After the execution engine 230 scans each record, the execution engine 230 determines whether or not that scanned record satisfies the search criteria, e.g., whether or not each record satisfies combinations of keys specified by the query 158.

Figure 3:
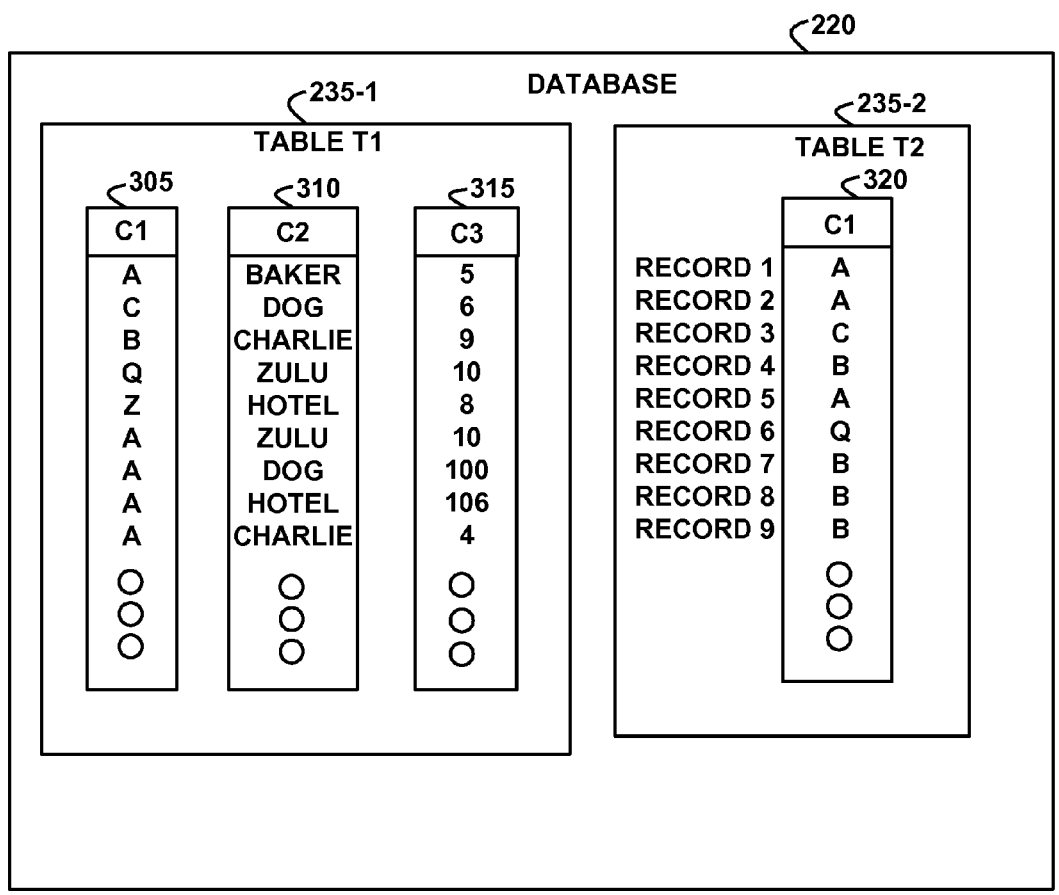
FIG. 3 depicts a block diagram of an example data structure for a database with example data, according to an embodiment of the invention.

FIG. 3 depicts a block diagram of an example data structure for a database 220 with example data, according to an embodiment of the invention. The example database 220 comprises example tables t1 235-1 and t2 235-2. The tables are organized into rows, each of which represent individual entries, tuples, or records in the database, and columns, keys, fields, or attributes that define the organization or structure of the data values that are stored in each record, entry, tuple, or record. Each data table has a unique name within the database 220 and each column has a unique name within the particular table.

The table 235-1 comprises example columns c1 305, c2 310, and c3 315. The table t2 235-2 comprises the example column c1 320. Columns 305 and 320 share the same column name or identifier "c1." Thus, the columns are uniquely identified herein using the notation t1.c1 (referring to column 305 in table 235-1), t1.c2 (referring to column 310 in table 235-1), t1.c3 (referring to column 315 in table 235-1), and t2.c1 (referring to column 320 in table 235-2).

Each table in the example database 220 is divided into records and columns. For example, the table T1 235-1 comprises a first record of (A, BAKER, 5) with "A" stored in the column c1 305, "BAKER" stored in the column c2 310, and "5" stored in the column c3 315; a second record of (C, DOG, 6) with "C" stored in the column c1 305, "DOG" stored in the column c2 310 and "6" stored in the column c3 315; a third record of (B, CHARLIE, 9) with "B" stored in the column c1 305, "CHARLIE" stored in the column c2 310 and "9" stored in the column c3 315, etc. As another example, the table T2 235-2 comprises a first record of (A) stored in the column c1 320, a second record of (A) stored in the column c1 320, a third record of (C) stored in the column c1 320, etc. The Table T2 235-2 illustrates record identifiers ("record 1," "record 2," etc.), which identify the respective records in the table T2 235-2. In an embodiment, the record identifiers are addresses (either absolute, relative, physical, logical, or virtual addresses) that identify the storage location of the respective record. In an embodiment, the record identifiers are pointed to by addresses or identifiers in the index 240. Although only the table 235-2 explicitly illustrates the record identifiers, they may exist for all tables and records.

Figure 4:
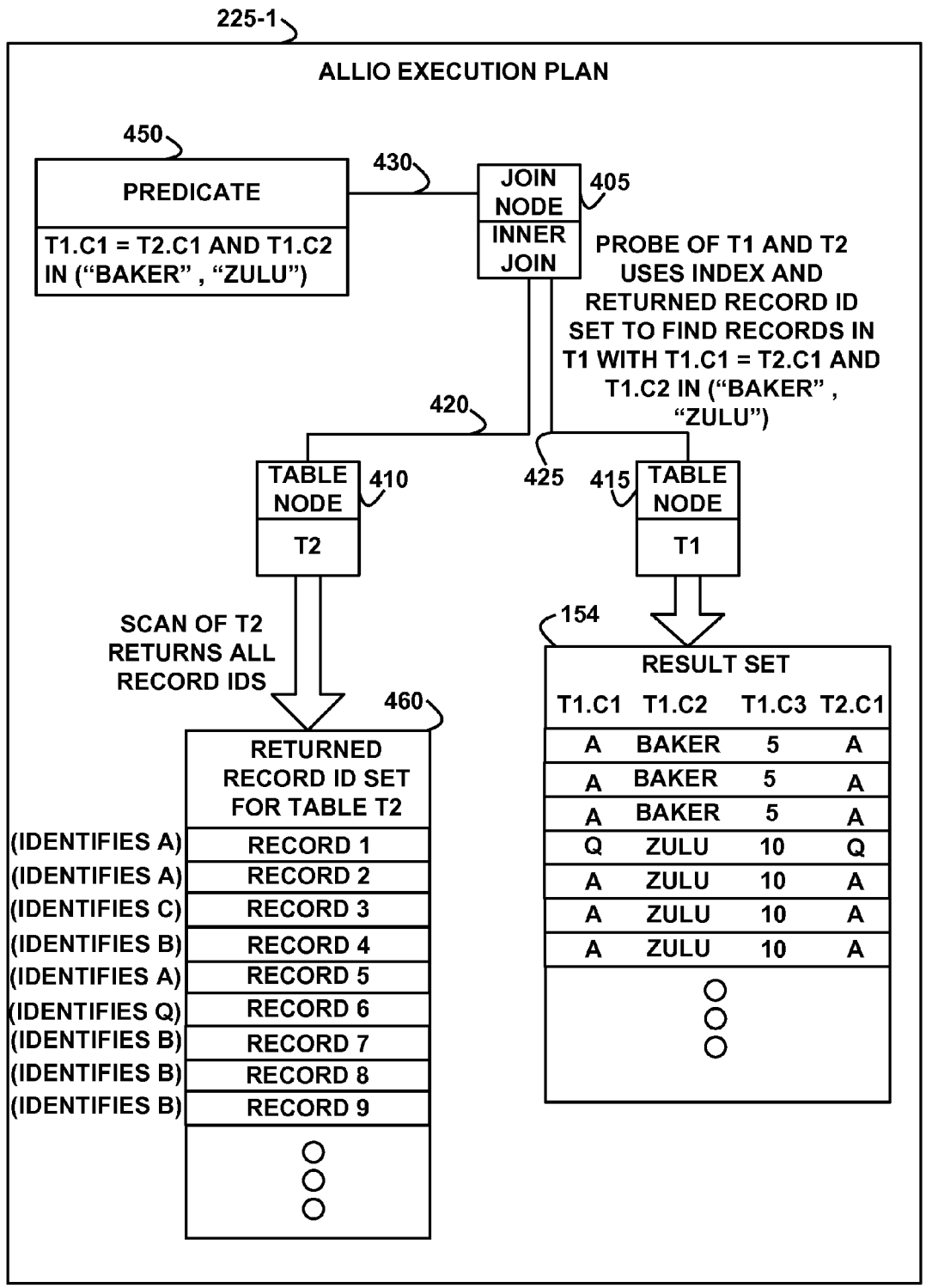
FIG. 4 depicts a block diagram of an example ALLIO execution plan that implements a query, according to an embodiment of the invention.

FIG. 4 depicts a block diagram of an example ALLIO execution plan 225-1 that implements a query, according to an embodiment of the invention. The execution plan 225-1 is an example of, and is generically referred to by, the execution plan 225 (FIG. 2). The example execution plan 225-1 comprises a tree graph, which is a data structure that represents the join operations that implement a query, and those join operations have a join order. In response to a query that requests data from multiple tables, the DBMS 150 joins tuples from the multiple tables (the tuples are concatenated, in an embodiment horizontally, in the result set), in order to find and retrieve the data from all the tables. Thus, a join operation is a relationship between two tables accessed by execution of a query (a join query), and the DBMS 150 performs a join operation to connect (or join) data from two or more tables, wherein the DBMS 150 joins tuples with matching attributes together to form a new tuple. The execution plan 225 may specify the join order, which is the order in which the DBMS 150 performs join operations when the DBMS 150 executes the query 158 via executing the execution plan 225 to retrieve and join records of data from the database tables into the result set.

Because a single join is limited to accessing two tables, the DBMS 150 performs multi-table joins in sequence according to a particular order, which the DBMS 150 implements using a nested loop algorithm, wherein the DBMS 150 joins resultant new tuples from the first two tables in the join order to the resultant tuples from the third table, and then the DBMS 150 joins those results to the fourth table, etc. Eventually all of the needed join operations are complete, and the resultant new tuples are the result set that satisfies the query 158. Many different join queries may be implemented by joining the tables in any of several possible join orders. For example, a query 158 that involves joining tables A, B, and C can often be performed as a join of table A and B followed by a join of table A and C. Alternatively, in many instances, the same query can be performed as a join of table A and C followed by the join of table A and B. In an embodiment, the query optimizer 215 selects a join order that eliminates the greatest number of records from the potential result set early in the join processing, which saves the costs that result from repeatedly accessing tables later in the join operation.

The tree graph of the execution plan 225-1 illustrates one example implementation and one example join order for the example query 158, but other implementations and join orders for the query 158 also exist. In FIG. 4, the example query 158, which the execution plan 225-1 implements, may be represented as: "select * from t1, t2 where t1.c2 in ("BAKER", "ZULU") and t1.c1=t2.c1."

The tree graph of the execution plan 225-1 comprises the join node 405 and the child table nodes 410 and 415, which are connected to the parent join node 405 via links 420 and 425. The table node 410 represents the table t2 235-2. The table node 415 represents the table t1 235-1. The predicate 450 is connected to the join node 405. The join node 405 represents a join operation of the tables represented by the child table nodes 410 and 415 using the predicate 450. Thus, using the example tree of the execution plan 225-1 of FIG. 4, the root node is the node 405, which is the parent of its child nodes 410 and 415. The nodes 410 and 415 have no child nodes, so they are leaf nodes. The ancestor of the node 410 is the node 405, and the ancestor of the node 415 is the node 405. The node 405, which is the root node of the tree, has no ancestors. The links 420 and 425 between the nodes connect, point to, or contain the address of two adjacent nodes, and allow the DBMS 150 to find the child nodes of a parent node and find the parent node of a child node. The link 430 connects, points to, or comprises the address of the predicate 450, and allows the DBMS 150 to find the predicate of the node.

The nodes 405, 410, and 415 in the tree graph of the execution plan 225-1 have a hierarchical organization, in that the join node 405 has a relationship with another join node 410, which itself may have a further relationship with another node, and so on. Thus, the nodes may be divided into groups and sub-groups, which ultimately all have a relationship to the root or head node 405.

To define a tree more formally, a tree data structure defines the hierarchical organization of nodes. Hence, a tree is a finite set, T, of one or more of nodes, such that a) one specially designated node is called the root of the entire tree; and b) the remaining nodes (excluding the root) are partitioned into m>=0 disjoint sets T1, . . . Tm, and each of these sets is in turn a tree. The trees T1, . . . , Tm are called the subtrees of the root. Thus, every node in a tree is the root of some subtree contained in the whole tree. The number of subtrees of a node is called the degree of that node. A node of degree zero is called a terminal compute node or a leaf. A non-terminal node is called a branch node. The level of a node with respect to T is defined by saying that the root node has level 0, and other nodes have a level that is one higher than they have with respect to the subtree that contains them. Each root is the parent of the roots of its subtrees, the latter are siblings, and they are also the children of their parent. Each root is an ancestor of all of the nodes in all of the root's subtrees. The nodes in the subtrees of a root node are the root's descendants. The root node of the entire tree has no parent node. A tree graph, with parent and child nodes, is merely a logical representation of a query execution, which aids in understanding how the execution engine 230 executes a particular query. But, the execution plan 225 may comprise proprietary code that the execution engine 230 executes. This code does not specifically require parent nodes and child nodes but, instead, comprises logic that is represented by a tree graph model having such nodes and connections and can be implemented as other types of data structures as well. Accordingly, for ease of understanding, the execution plan is described herein using tree graph terminology, but other embodiments do not require actual creation and modification of a tree graph.

Although one predicate 450 is illustrated in FIG. 4, multiple predicates, each representing a portion or subset of the query may exist, each connected to a different node. The predicate 450 comprises conditional criteria expressions, which the DBMS 150 evaluates to either true or false by substituting data from the records retrieved from the table nodes (that are connected to the predicate or that are the child node of a join node that is connected to the predicate) into variables in the expression that match column identifiers in the records. In various embodiments, a predicate may specify any multiple, and/or combination of: data; columns, fields, or keys; values in the columns, fields, or keys; functions, calls, invocations, methods, classes, or applets; relational operators (e.g., greater than, less than, equal to, not equal to, greater than or equal to, less than or equal to, or any other relational operator); logical operators (e.g., AND, OR, XOR, NOT, NOR, NAND, or any other logical operator); arithmetic operators (e.g., multiplication, division, addition, subtraction, bases, powers, logarithms, or any other arithmetic operators); and register operations (e.g., shift left, shift right operations, or any other register operation). The relational operators, logical operators, arithmetic operators, and register operations may have any number of arguments or operands (e.g., they may be unary, binary, ternary, or n-ary).

The DBMS 150 reads a join node, and in response, reads a record from a table node or nodes, substitutes the data from the columns in the record that have the same table and column identifier as specified in the predicate that is connected to the join node, and evaluates the resultant predicate expression to either true or false. If the predicate expression evaluates to true, then the read record satisfies or meets the connected predicate, so the DBMS 150 saves the record to the result set 152. If the predicate expression evaluates to false, then read record does not satisfy or meet the predicate, so the DBMS 150 excludes the read record from the result set 152.

The join nodes represent join operations of tables whose records satisfy the connected predicate. In various embodiments, the join operations may comprise inner joins, equi-joins, natural joins, outer joins, left outer joins, right outer joins, full outer joins, exception joins, and self joins. An inner join between two tables results in only the tuples matching certain selection criteria to be returned in the result set 152. An outer join, such as a left join of table A and table B (according to a set of selection criteria) returns all matching records as well as those records in table A not having a match in table B. The matching records have the values of all their fields populated by the data from table A and table B. But, the non-matching records from table A have a null value, or other default character, in the fields from table B. Another outer join, such as a right join of table A and table B, also returns all the matching records but, unlike the left join, returns those records in table B not having a matching record in table A. An exception join of table A and table B returns a result set of those records in table A for which no matching record in table B exists. A left join and a left outer join are equivalent terms, a right join and a right outer join are equivalent term, and an inner join and an equi-join are equivalent terms.

The join node 405 represents a join operation of the tables represented by the child table nodes 410 and 415 using the connected predicate 450. In an embodiment, the join nodes represent logic in the DBMS 150 that performs the join operation that finds records in the child table nodes, whose column values satisfy the criteria of the predicate when the logic of the join node substitutes the column values of the found records into the placeholders or variables in the predicate that have the same name or identifier as the column identifiers in the records.

In operation, the DBMS 150 executes the query 158 using the execution plan 225-1, as follows. The DBMS 150 begins traversing the nodes and encounters (reads) the head join node 405. Since the join node 405 is not a table node, the DBMS 150 reads the predicate 450 and travels to the left child node 410 of the join node 405, in search of records that satisfy the predicate 450. The DBMS 150 encounters (reads) the table node 410. Since the join node 410 is a table node, the DBMS 150 retrieves the records from the table represented by the table node 410, using a scan operation, that satisfy the predicate 450 and returns the record identifiers that represent the scanned records to the join node 405 in the returned record identifier set 460. In the illustrated example, the DBMS 150 scans the table t2 and returns the returned record identifier set 460 with record identifiers from the table t2 that contain all values in the column c1 because the predicate 450 does not restrict the values in t2.c1 until records from table t1 have also been read.

In response to scanning the records of the table t2, the DBMS 150 then traverses the graph to the parent node 405 of the table node 410 and then traverses the graph to the right child node of the join node 405, encounters the table node 415, and uses the index 240 to find records in the table t1 that contain t1.c1 values that equal the t2.c1 values in records identified by the returned record identifier set 460 where t1.c2 is a member of ("BAKER", "ZULU"), i.e., those t1.c1 and t2.c1 values that satisfy the predicate 450. The DBMS 150 finds the records via probe operations that indirectly and randomly access the table t1 via the record identifiers of the returned record identifier set 460, that submit the key t1.c2 and the key values ("BAKER", "ZULU") to the index 240, and that submit the t1.c1 key and the t2.c1 values as key values (in order to find the records that satisfy the "t1.c1=t2.c1" predicate) to the index. In response to receiving a key and value of the key, the index of a table returns the record identifier of the record in the table that comprises the submitted value in the column identified by the key.

Thus, execution of the ALLIO execution plan 225-1 results in the result set 154, which includes the joined values of records from t1.c1, t1.c2, t1.c3, and t2.c1. The execution of the ALLIO execution plan 225-1 causes the result set 154 to include duplicate records because each record in t1.c1 with a value of "A" matches (contains the same or identical value as) three records in t2.c1.

The table node 410 representing the table t2 235-2 is the first table in the join order of the execution plan 225-1 because the DBMS 150 reads a record from the table t2 235-2 prior to reading records from any of the other tables (represented by the node 415) in the join order. The table t1 235-1 represented by the node 415 is second (and last) in the join order because the DBMS 150 reads a record from the table t1 235-1 after reading a record from the table t2, in order to determine if the predicate 450 is satisfied.

Figure 5:
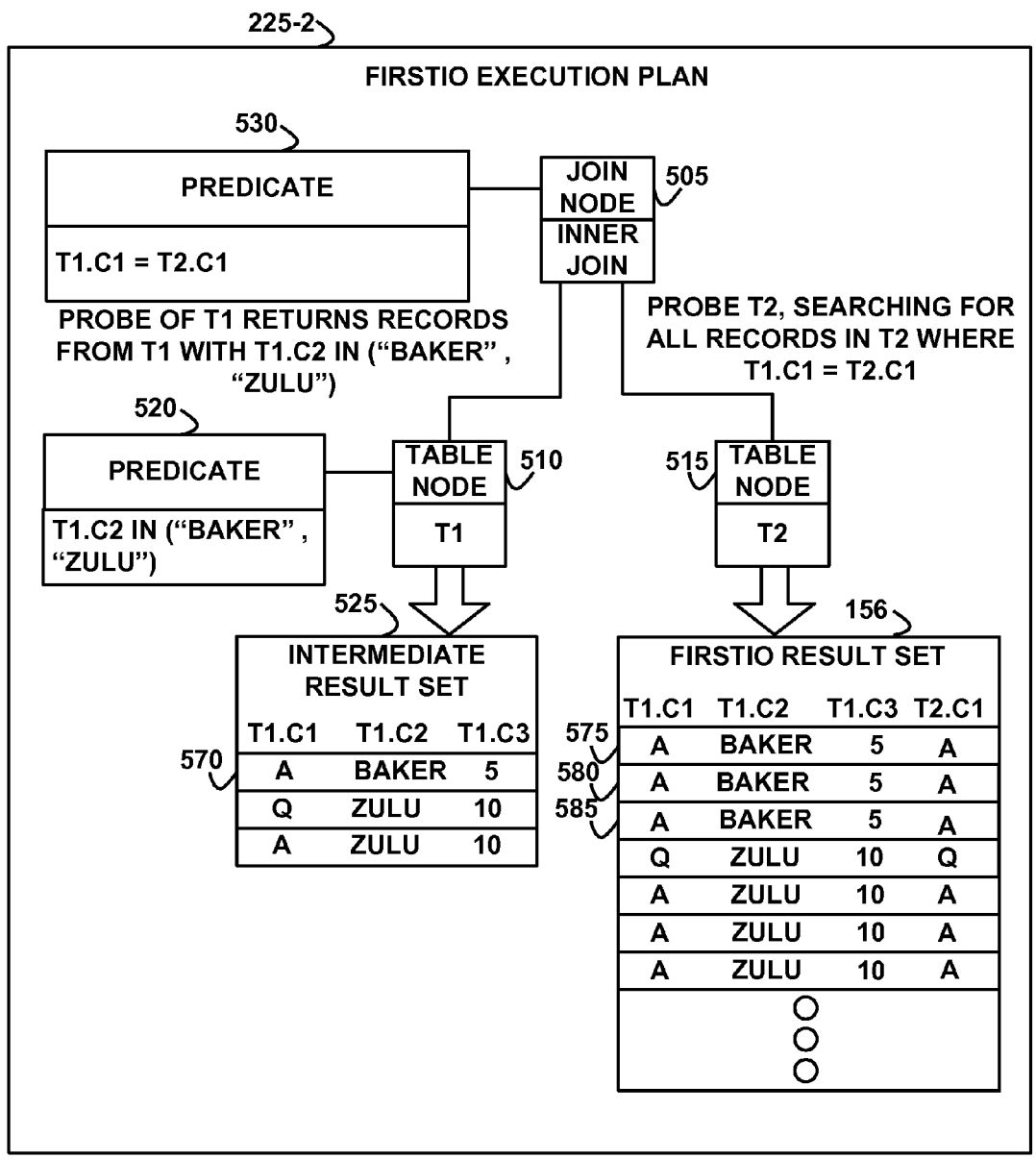
FIG. 5 depicts a block diagram of an example FIRSTIO execution plan that implements a query, according to an embodiment of the invention.

FIG. 5 depicts a block diagram of an example FIRSTIO execution plan 225-2 that implements a query, according to an embodiment of the invention. The FIRSTIO execution plan 225-2 is an example of, and is generically referred to by, the execution plan 225 (FIG. 2). The example FIRSTIO execution plan 225-2 illustrates one example tree graph of a FIRSTIO implementation and one example join order for the example query 158, but other implementations and join orders for this query 158 also exist, including embodiments that do not use a tree and that do not use a graph. In the example of FIG. 5, the query 158, which the execution plan 225-2 implements, may be represented as: "select * from t1, t2 where t1.c2 in ("BAKER", "ZULU") and t1.c1=t2.c1," which is the same query as implemented by the execution plan 225-1 (FIG. 4).

The tree graph of the FIRSTIO execution plan 225-2 comprises the join node 505 connected to the table nodes 510 and 515, which are child nodes of the join node 505. The execution plan 225-2 further comprises the predicates 520 and 530, which are connected to the join nodes 510 and 505, respectively. The table node 510 represents the table t1 235-1. The table node 515 represents the table t2 235-2. The join node 505 represents a join operation of the tables represented by the child table nodes 510 and 515 using the predicates 520 and 530. The predicates 520 and 530 are portions of the query 158.

In operation, the DBMS 150 executes the query 158 using the execution plan 225-2 as follows. The DBMS 150 begins traversing the nodes at the root or head node and encounters (reads) the head join node 505. Since the join node 505 is not a table node, the DBMS 150 traverses to the left child table node 510 of the parent join node 505 via the connecting link, in search of a first record. The DBMS 150 encounters (reads) the table node 510. Since the table node 510 is a table node and not a join node, the DBMS 150 retrieves the first record from the table T1 represented by the table node 510, using a probe operation that passes a key or keys and a value or values of the keys specified by the predicate 520 to the index 240. The index 240 returns a record identifier that identifies a record(s) in the table t1 that comprise data in the column identified by the key that match the value specified by the predicate 520. The DBMS 150 then reads the record from the table t1 identified by the record identifier and adds the record to the intermediate result set 525. For example, the DBMS 150 reads the record of (A, Baker, 5) and adds it to the intermediate result set 525 as the record 570.

The DBMS 150 then traverses the graph to the parent node of the table node 510, which is the join node 505, and reads the join node 505 and the predicate 530. The DBMS 150 then traverses the right link of the join node 505, encounters (reads) the right child node 515, and probes the table T2 identified by the table node 515, searching for a record, which in combination with the record 570 in the intermediate result set 525 satisfies the predicate 530. For example, since the record 570 in the intermediate result set 525 comprises "A" in the T1.C1 column, and the predicate 530 comprises "T1.C1=T2.C1," the DBMS 150 uses C1=A as a key that identifies a column and value, and inputs the key and value into the index for the table T2, which yields "record 1," "record 2," and "record 5" (FIG. 3) as the records in the table T2 that comprises "A" in T2.C1. The DBMS then joins or concatenates the record 570 from the intermediate result set 525 with the value "A" (returned three times from the probe of the table T2) and stores the resultant records 575, 580, and 585 in the FIRSTIO result set 156. The DBMS 150 then returns to the table node 510 and probes the table T1 for the next record that satisfies the predicate 520, etc.

Note that, in determining whether or not a record in the table T2 satisfies the predicate 530, the DBMS 150 uses the record 570 that was found in the table T1 and was returned in the intermediate result set 525, in order to compare t1.c1=t2.c1. If the DBMS 150 does not find a record in the table t2 that satisfies the predicate 530 for the first record 570 in intermediate result set 525 returned from the join node 510, then the DBMS 150 returns to the join node 510 and re-performs the probe, retrieving the next record from the table t1 that meets the predicate 520 before returning to the join node 505 and to the table node 515 and once again searching for a record in the table T2 that meets the predicate 530.

Thus, the table node 510 representing the table t1 235-1 is the first table in the join order of the execution plan 225-2 because the DBMS 150 probes the records from the table t1 235-1 prior to reading records from any of the other tables (represented by the nodes 515) in the join order. The table T2 235-2 represented by the node 515 is second (and last) in the join order because the DBMS 150 probes records from the table T2 235-2 after probing records from the table 235-1, in order to determine if the predicate 530 is satisfied. Note that the first table in the join order of the FIRSTIO execution plan 225-2 of FIG. 5 is not the same table as the first table in the join order of the ALLIO execution plan 225-1 of FIG. 4. In various embodiments, the join order of the FIRSTIO execution plan 225-2 and the ALLIO execution plan 225-1 may be the same or different.

Figure 6:
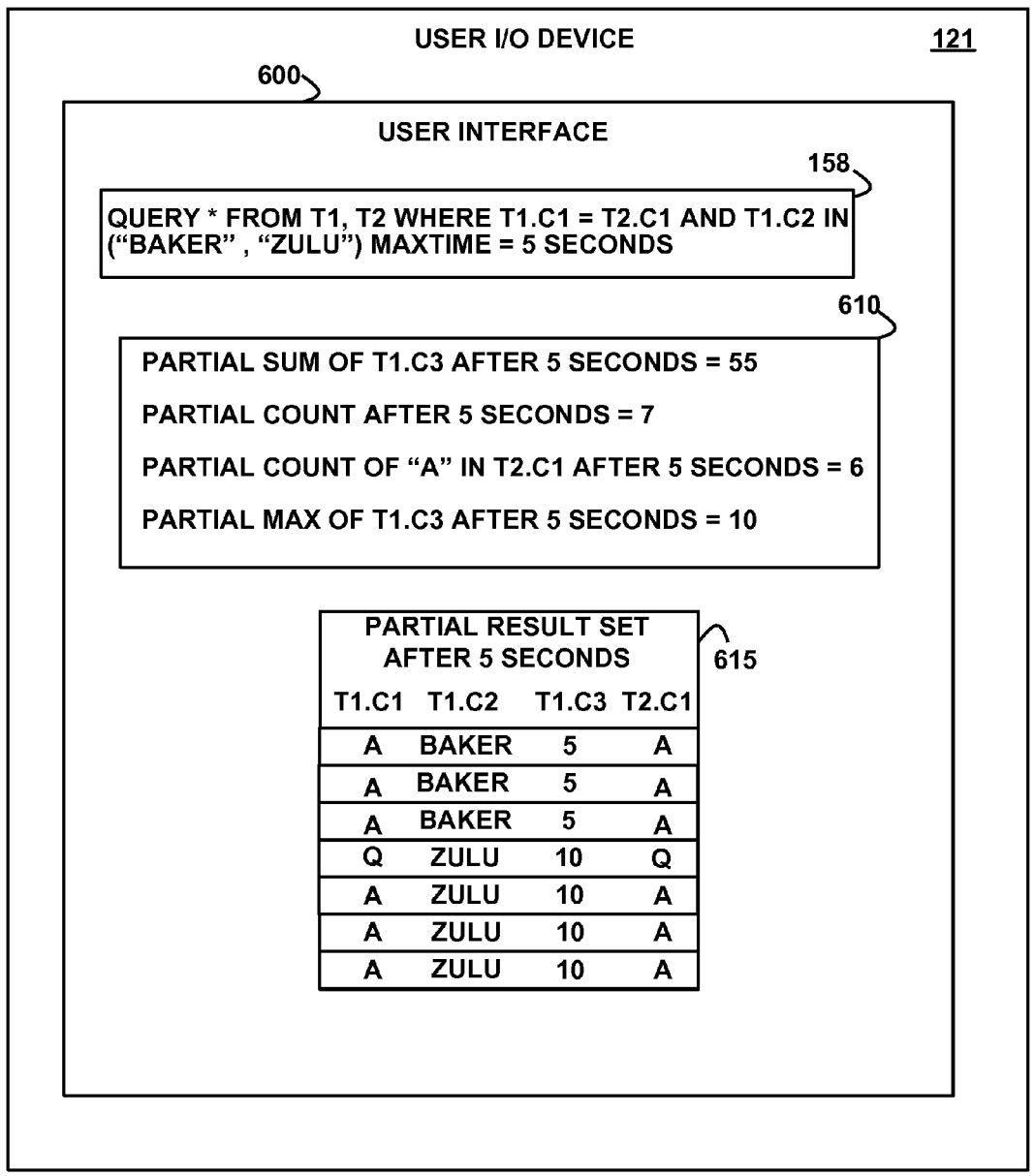
FIG. 6 depicts a block diagram of an example user interface displayed on a user Input/Output (I/O) device, according to an embodiment of the invention.

FIG. 6 depicts a block diagram of an example user interface 600 displayed on a user I/O device 121, according to an embodiment of the invention. The user interface 600 comprises a query 158, partial statistics 610, and a partial result set window 615. In an embodiment, the application 160 displays the user interface 600 on the user I/O device 121 and sends the query 158, which the user entered into the user interface 600, to the DBMS 150. The example query 158 requests that the DBMS 150 search for records in the database tables "T1" and "T2" that satisfy the criteria of the data in the found records, having data in the column c1 in the table t1 that are equal to the data in the column c1 in the table t2 and having data in the found records in the column c2 in the table t1 that is either "Baker" or "Zulu." The example query 158 also specifies a maximum time of five seconds, meaning that the query 158 requests that the DBMS 150 stop searching for records that satisfy the search criteria after 5 seconds and display whatever partial results the DBMS 150 has found that satisfy the search criteria, even if the DBMS 150 has not found all records that satisfy the search criteria.

The DBMS 150 displays the partial result set window 615, which is a display of either the ALLIO result set 154 or the FIRSTIO result set 156, and comprises the records found within the specified maximum time that satisfy the search criteria specified by the query 158. If the partial result set window 615 displays the contents of the FIRSTIO result set 156 (FIG. 1), then in the example shown, the number of result set record that are simultaneously viewable is seven, since the example partial result set window 615 illustrates seven records. The DBMS 150 optionally displays partial statistics 610, which describe the partial result set window 615, such as the sum of the data in any column of the partial result set window 615, a count of the number of records in the partial result set window 615, a count of the number of any data value in the partial result set window 615, the maximum or minimum value in any column in the partial result set, or any other statistic that characterizes or describes the partial result set window 615.

Figure 7:
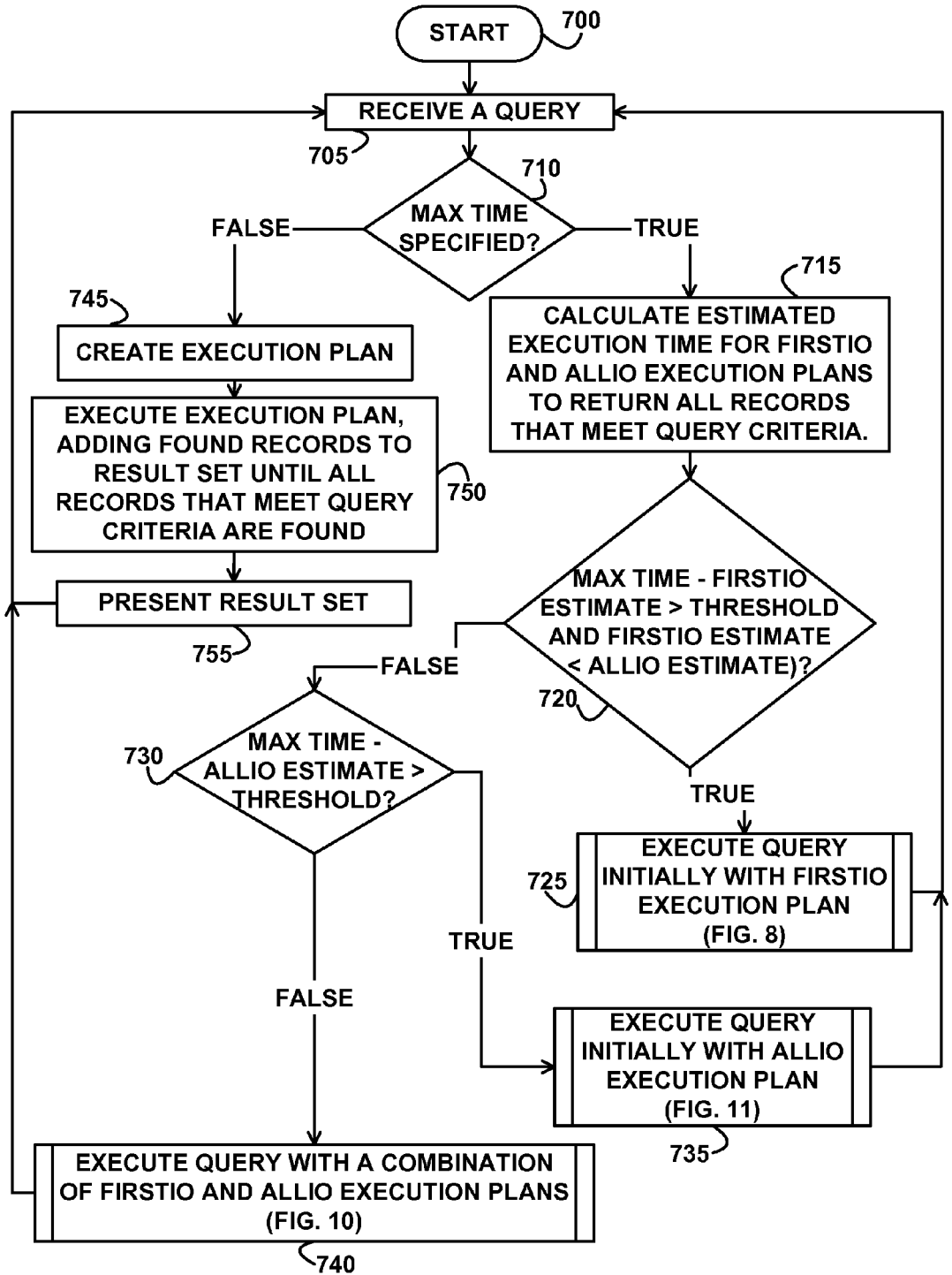
FIG. 7 depicts a flowchart of example processing for a query, according to an embodiment of the invention.

FIG. 7 depicts a flowchart of example processing for a query, according to an embodiment of the invention. Control begins at block 700. Control then continues to block 705 where the DBMS 150 receives a query 158 from the application 160. Control then continues to block 710 where the DBMS 150 determines whether the query 158 specifies a maximum amount of time that the query 158 is allowed to execute. If the determination at block 710 is true, then the query 158 specifies a maximum amount of time that the query 158 is to execute, so control continues to block 715 where the DBMS 150 creates FIRSTIO and ALLIO execution plans that implement the query (if they do not already exist) and calculates estimated times for the execution of the FIRSTIO and the ALLIO execution plans to return all records from the database that meet the query criteria. In various embodiments, the DBMS 150 may calculate the estimated times using such factors as the number of records in the tables, the cardinality of the keys of the query 158, the cardinality of tables with respect to each other, or any other appropriate factors.

Control then continues to block 720 where the DBMS 150 determines whether the maximum time minus the FIRSTIO execution plan estimated time is greater than a threshold amount of time and FIRSTIO execution plan estimated time is less than the ALLIO execution plan estimated time. In various embodiments, the thresholds used by the DBMS 150 may be input by the user, by the application, 160, by a database administrator, or by the designer of the DBMS 150. If the determination at block 720 is true, then the maximum time minus the FIRSTIO execution plan estimated time is greater than a threshold amount of time and FIRSTIO execution plan estimated time is less than the ALLIO execution plan estimated time, so control continues to block 725 where the DBMS 150 executes the query initially using the FIRSTIO execution plan, as further described below with reference to FIG. 8. Control then returns to block 705 where the DBMS 150 receives another query (the same or a different query from the same or a different application), as previously described above. If the determination at block 720 is false, then the maximum time minus the FIRSTIO estimated time is less than or equal to the threshold amount of time or the FIRSTIO estimated time is greater than or equal to the ALLIO estimated time, so control continues to block 730 where the DBMS 150 determines whether the maximum time minus the ALLIO estimated time is greater than a threshold amount of time. If the determination at block 730 is true, then the maximum time minus the ALLIO estimated time is greater than a threshold amount of time, so control continues to block 735 where the DBMS 150 executes the query 158 initially with the ALLIO execution plan, as further described below with reference to FIG. 11. Control then returns to block 705 where the DBMS 150 receives another query (the same or a different query from the same or a different application), as previously described above. If the determination at block 730 is false, then the maximum time minus the ALLIO estimated time is less than or equal to a threshold amount of time, so control continues to block 740 where the DBMS 150 executes the query 158 with a combination of the FIRSTIO and the ALLIO execution plans, as further described below with reference to FIG. 10. Control then returns to block 705 where the DBMS 150 receives another query (the same or a different query from the same or a different application), as previously described above.

If the determination at block 710 is false, then the query 158 does not specify a maximum time that the query 158 is allowed to execute, so control continues to block 745 where the DBMS 150 creates an execution plan (if an execution plan for the query 158 does not already exist). In various embodiments, the execution plan of block 745 may be the same as one of the FIRSTIO and ALLIO execution plans or may be different from both the FIRSTIO and ALLIO execution plans. Control then continues to block 750 where the DBMS 150 executes the execution plan, adding found records to a result set until all records that meet query criteria are found. Control then continues to block 755 where the DBMS 150 presents or displays the result set via the user I/O device 121. Control then returns to block 705 where the DBMS 150 receives another query (the same or a different query from the same or a different application), as previously described above.

Figure 8:
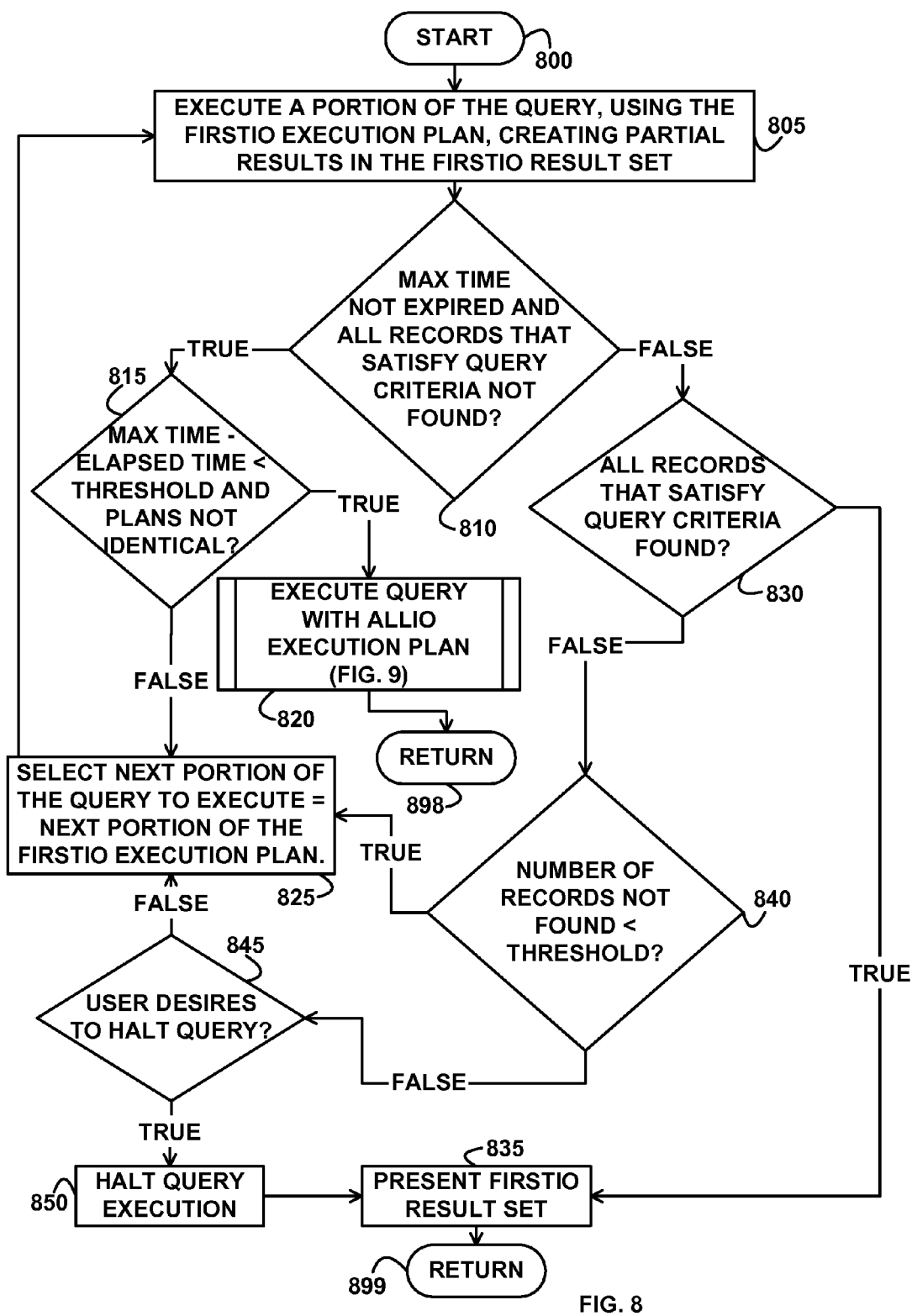
FIG. 8 depicts a flowchart of example processing for executing a query initially with a FIRSTIO execution plan, according to an embodiment of the invention.

FIG. 8 depicts a flowchart of example processing for executing a query initially with a FIRSTIO execution plan, according to an embodiment of the invention. Control begins at block 800. Control then continues to block 805 where the DBMS 150 executes a portion of the query 158 using the FIRSTIO execution plan. The DBMS 150 stores records in the FIRSTIO result set 156 that result from the execution of the portion of the FIRSTIO execution plan. In an embodiment, the DBMS 150 selects a portion of the query 158 by selecting a certain number or percentage of the records (which is less than the total number or percentage of records) to read from the first table in the join order. During every execution of the loop that starts at block 805, the DBMS 150 reads a different portion of the records from the first table in the join order.

Control then continues to block 810 where the DBMS 150 determines whether the maximum time has not expired and all records that satisfy the criteria of the query 158 have not been found. That is, the DBMS 150 determines whether the elapsed time since the query 158 was received by the DBMS 150 exceeds the maximum time and the DBMS 150 has not yet found all records that satisfy the query 158. If the determination at block 810 is true, then the maximum time has not expired and all records that satisfy the query have not been found, so control continues to block 815 where the DBMS 150 determines whether the maximum time minus the elapsed time since the query 158 was received is less than a threshold amount of time and the FIRSTIO and ALLIO execution plans are not identical. If the determination at block 815 is true, then the maximum time minus the elapsed time since execution of the query 158 was received is less than a threshold and the FIRSTIO and ALLIO execution plans are not identical, so control continues to block 820 where the DBMS 150 stops executing the query 158 with the FIRSTIO execution plan and executes the query 158 with the ALLIO execution plan, as further described below with reference to FIG. 9. Thus, the time period expires in which the FIRSTIO execution plan is executed, and the ALLIO execution plan executes in a time period after the FIRSTIO execution plan. Control then continues to block 898 where the logic of FIG. 8 returns.

If the determination at block 815 is false, then the maximum time minus the elapsed time since the query 158 was received is greater than or equal to the threshold or the FIRSTIO and ALLIO execution plans are identical, so control continues to block 825 where the DBMS 150 sets the next portion of the query 158 to execute to be the next unexecuted portion of the FIRSTIO execution plan. Control then returns to block 805 where the DBMS 150 executes the next portion of the query 158 with the FIRSTIO execution plan, as previously described above. If the determination at block 810 is false, then the maximum time has expired or all records that satisfy the query 158 have been found, so control continues to block 830 where the DBMS 150 determines whether all records that satisfy the query criteria have been found. If the determination at block 830 is true, then all records that satisfy the query criteria have been found, so control continues to block 835 where the DBMS 150 presents or displays the FIRSTIO result set via the user I/O device. In an embodiment, the FIRSTIO and ALLIO execution time periods expire in response to expiration of the maximum time specified by the query. Control then continues to block 899 where the logic of FIG. 8 returns.

If the determination at block 830 is false, then the maximum time has expired and all records that satisfy the query have not been found, so control continues to block 840 where the DBMS 150 determines whether the number of records that have not been found (have not been examined to determine whether or not they meet the query criteria) is less than a threshold number or threshold percentage of the total number of records in the tables. If the determination at block 840 is true, then the maximum time has expired, all records have not been found, and the number of records not found is less than a threshold number, so control continues to block 825 where the DBMS 150 selects the next portion of the query 158 to execute using the FIRSTIO execution plan, as previously described above. Thus, if the number of records not found is less than the threshold, then the DBMS 150 continues to execute the FIRSTIO execution plan, even though the maximum time has expired. If the determination at block 840 is false, then the maximum time has expired, all records have not been found, and the number of records not found is greater than or equal to a threshold number, so control continues to block 845 where the DBMS 150 determines whether the user requests to halt the query execution. In an embodiment, the DBMS 150 sends a confirmation message to the application 160 that sent the query 158 or to the user I/O device and receives a response of a command that requests the query 158 to either halt or continue.

If the determination at block 845 is true, then the user requests to halt the query execution, so control continues to block 850 where the DBMS 150 halts the query execution of the FIRSTIO execution plan. Control then continues to block 835 where the DBMS 150 presents or displays, via the user I/O device, the partial FIRSTIO result set 156 that the DBMS 150 retrieved from the database prior to the halt of the execution of the FIRSTIO execution plan. Control then continues to block 899 where the logic of FIG. 8 returns. If the determination at block 845 is false, then the user consents or requests to allow execution of the query 158 with the FIRSTIO execution plan to continue even though the maximum time has expired, so control continues to block 825, as previously described above.

Figure 9:
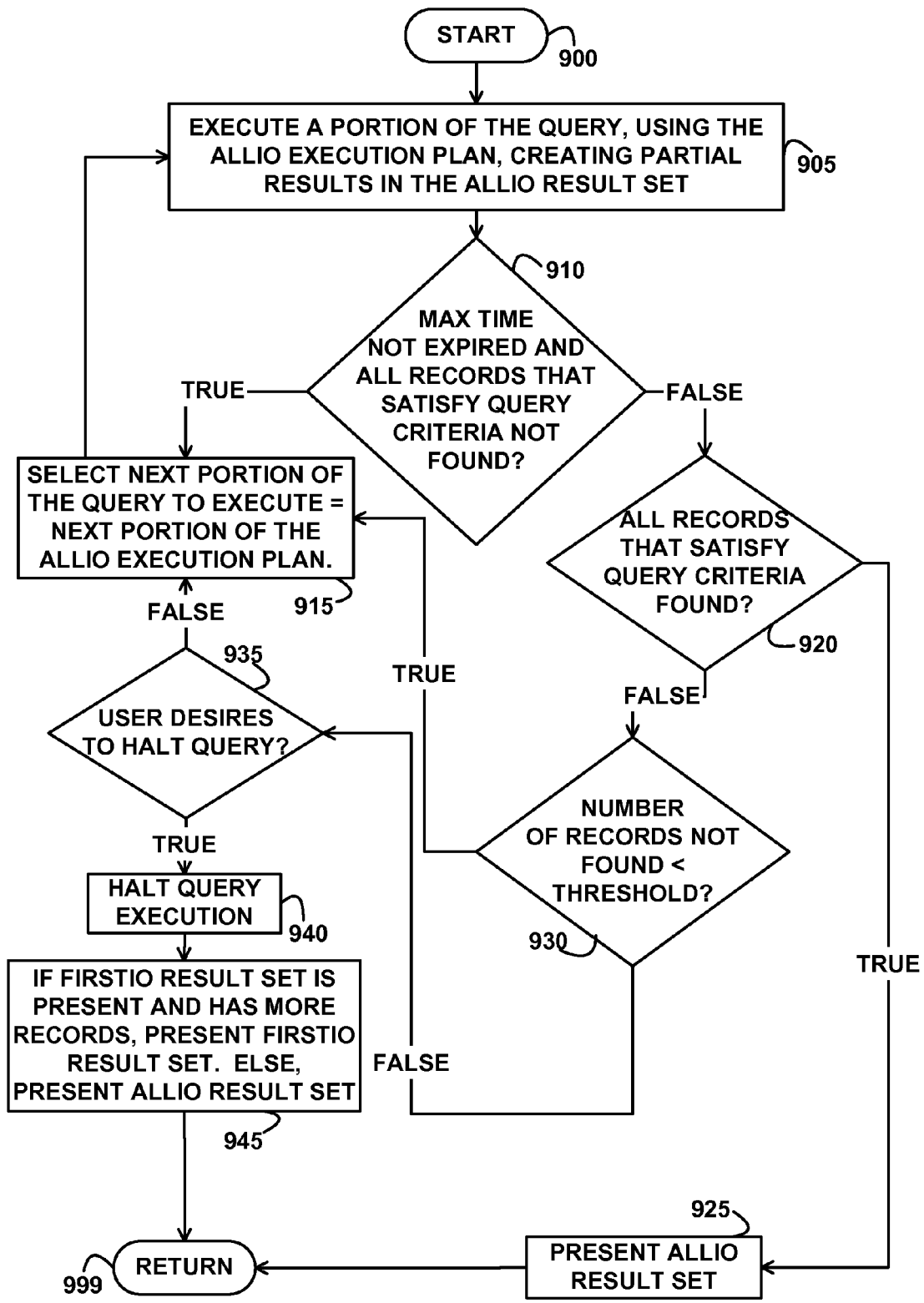
FIG. 9 depicts a flowchart of example processing for executing a query with an ALLIO execution plan, according to an embodiment of the invention.

FIG. 9 depicts a flowchart of example processing for executing a query with an ALLIO execution plan, according to an embodiment of the invention. Control begins at block 900. Control then continues to block 905 where the DBMS 150 executes a portion of the query 158 using the ALLIO execution plan. The DBMS 150 stores records in the ALLIO result set 154 that result from the execution of the portion of the ALLIO execution plan. In an embodiment, the DBMS 150 selects a portion of the query 158 by selecting a certain number or percentage of the records (which is less than the total number or percentage of records) to read from the first table in the join order. During every execution of the loop that starts at block 905, the DBMS 150 reads a different portion of the records from the first table in the join order.

Control then continues to block 910 where the DBMS 150 determines whether the maximum time has not expired and all records that satisfy the query 158 have not been found. If the determination at block 910 is true, then the maximum time has not expired and all records that satisfy the query 158 have not been found, so control continues to block 915 where the DBMS 150 sets the next portion of the query 158 to be the next unexecuted portion of the ALLIO execution plan. Control then returns to block 905 where the DBMS 150 executes the next portion of the query 158 using the ALLIO execution plan, as previously described above. If the determination at block 910 is false, then the maximum time has expired or all records that satisfy the query 158 have been found, so control continues to block 920 where the DBMS 150 determines whether all records that satisfy the query criteria have been found. If the determination at block 920 is true, then all records that satisfy the query criteria have been found, so control continues to block 925 where the DBMS 150 presents or displays the ALLIO result set 154 via the user I/O device 121. Control then continues to block 999 where the logic of FIG. 9 returns. If the determination at block 920 is false, then the maximum time has expired and all records that satisfy the query criteria have not been found, so control continues to block 930 where the DBMS 150 determines whether the number of records that have not been found is less than a threshold number.

If the determination at block 930 is true, then the maximum time has expired, all records that satisfy the query criteria have not been found, and the number of records not found is less than a threshold number, so control continues to block 915 where the DBMS 150 selects the next portion of the query 158 to execute using the ALLIO execution plan, as previously described above. Thus, if the number of records not found is less than the threshold, the query execution continues, even though the maximum time has expired.

If the determination at block 930 is false, then the maximum time has expired, all records that satisfy the query criteria have not been found, and the number of records not found is greater than or equal to a threshold number, so control continues to block 935 where the DBMS 150 determines whether the user requests to halt the query execution. In an embodiment, the DBMS 150 sends a confirmation message to the application that sent the query 158 or to the user I/O device and receives a response of a command that requests either the execution of the query 158 to halt or continue. If the determination at block 935 is true, then the user requests to halt the query execution, so control continues to block 940 where the DBMS 150 halts the query execution of the ALLIO execution plan. Control then continues to block 945 where the DBMS 150 presents or displays, via the user I/O device, the partial FIRSTIO result set that the DBMS 150 retrieved and discards and does not present the ALLIO result set if the partial FIRSTIO result set exists and has more records than the ALLIO result set. If the partial ALLIO result set has more records or the same number of records than the partial FIRSTIO result set or if the partial FIRSTIO result set does not exist, then the DBMS 150 presents or displays the partial ALLIO result set and discards and does not present the partial FIRSTIO result set. Control then continues to block 999 where the logic of FIG. 9 returns. If the determination at block 935 is false, then the user requests execution of the query 158 to continue even though the maximum time has expired, so control continues to block 915, as previously described above.

Figure 10:
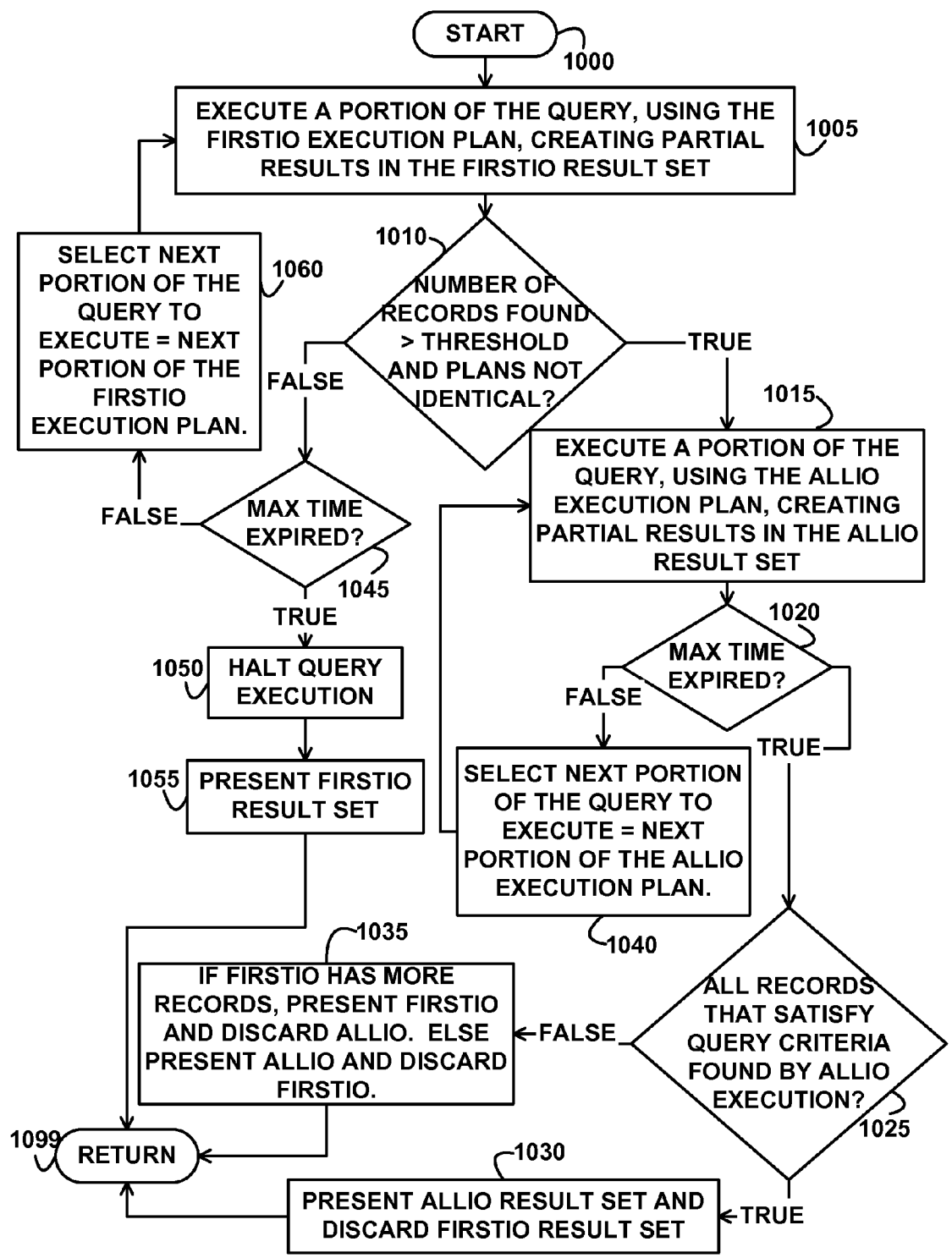
FIG. 10 depicts a flowchart of example processing for executing a query with a combination of a FIRSTIO and an ALLIO execution plan, according to an embodiment of the invention.

FIG. 10 depicts a flowchart of example processing for executing a query with a combination of FIRSTIO and ALLIO execution plans, according to an embodiment of the invention. Control begins at block 1000. Control then continues to block 1005 where the DBMS 150 executes a portion of the query 158 using the FIRSTIO execution plan. The DBMS 150 stores records in the FIRSTIO result set 156 that result from the execution of the portion of the FIRSTIO execution plan. In an embodiment, the DBMS 150 selects a portion of the query 158 by selecting a certain number or percentage of the records (which is less than the total number or percentage of records) to read from the first table in the join order via the index. During every execution of the loop that starts at block 1005, the DBMS 150 reads a different portion of the records from the first table in the join order. Control then continues to block 1010 where the DBMS 150 determines whether the number of records in the FIRSTIO result set is greater than a threshold number and the FIRSTIO and ALLIO execution plans are not identical.

If the determination at block 1010 is true, then number of records in the FIRSTIO result set is greater than a threshold and the FIRSTIO and ALLIO execution plans are not identical, so control continues to block 1015 where the DBMS 150 stops executing the query 158 that uses the FIRSTIO execution plan (the time period expires in which the FIRSTIO execution plan executes in response to a number of found records in the FIRSTIO result set exceeding a threshold). The DBMS 150 executes a portion of the query 158 using the ALLIO execution plan, creating partial results in the ALLIO result set, wherein the partial results comprise less than all of the records that satisfy the query. Thus, the ALLIO execution plan executes in a time period that starts after the time period of the FIRSTIO execution plan ends.

Control then continues to block 1020 where the DBMS 150 determines whether the maximum time has expired, i.e., the DBMS 150 determines whether the elapsed time since the query 158 was received is greater than the maximum time. If the determination at block 1020 is true, then the maximum time has expired, so the DBMS 150 stops execution of the ALLIO execution plan (the time period expires in which the ALLIO execution plan executes, in response to the maximum time expiring), and control continues to block 1025 where the DBMS 150 determines whether all records that satisfy the query criteria have been found by the execution of the ALLIO execution plan. If the determination at block 1025 is true, then the execution of the ALLIO execution plan has found all of the records that satisfy the query criteria, so control continues to block 1030 where the DBMS 150 presents or displays the ALLIO result set via the user I/O device and discards and does not present or display the FIRSTIO result set. Control then continues to block 1099 where the logic of FIG. 10 returns.

If the determination at block 1025 is false, then the DBMS 150 has not found all records that satisfy the query criteria, so control continues to block 1035 where, if the FIRSTIO result set comprises more records than the ALLIO result set, the DBMS 150 presents or displays the FIRSTIO result set via the user I/O device and discards and does not present or display the ALLIO result set. If the ALLIO result set has more records than the FIRSTIO result set or an equal number of records, the DBMS 150 presents or displays the ALLIO result set and discards and does not present or display the FIRSTIO result set. Control then continues to block 1099 where the logic of FIG. 10 returns. If the determination at block 1020 is false, then the maximum time has not expired, so control continues to block 1040 where the DBMS 150 sets the next portion of the query 158 to execute to be the next unexecuted portion of the ALLIO execution plan. Control then returns to block 1015 where the DBMS 150 executes the next portion of the query 158 using the ALLIO execution plan, as previously described above.

If the determination at block 1010 is false, then the number of records in the FIRSTIO result set is less than or equal to a threshold or the FIRSTIO and ALLIO execution plans are identical, so control continues to block 1045 where the DBMS 150 determines whether the maximum time has expired. If the determination at block 1045 is true, then the maximum time has expired, so control continues to block 1050 where the DBMS 150 halts execution of the query 158 that uses the FIRSTIO execution plan. Control then continues to block 1055 where the DBMS 150 presents or displays the partial FIRSTIO result set 156 via the user I/O device. Control then continues to block 1099 where the logic of FIG. 10 returns.

If the determination at block 1045 is false, then the maximum time has not expired, so control continues to block 1060 where the DBMS 150 sets the next portion of the query 158 to execute to be the next unexecuted portion of the FIRSTIO execution plan. Control then returns to block 1005 where the DBMS 150 executes the next portion of the query 158 using the FIRSTIO execution plan, as previously described above.

Figure 11:
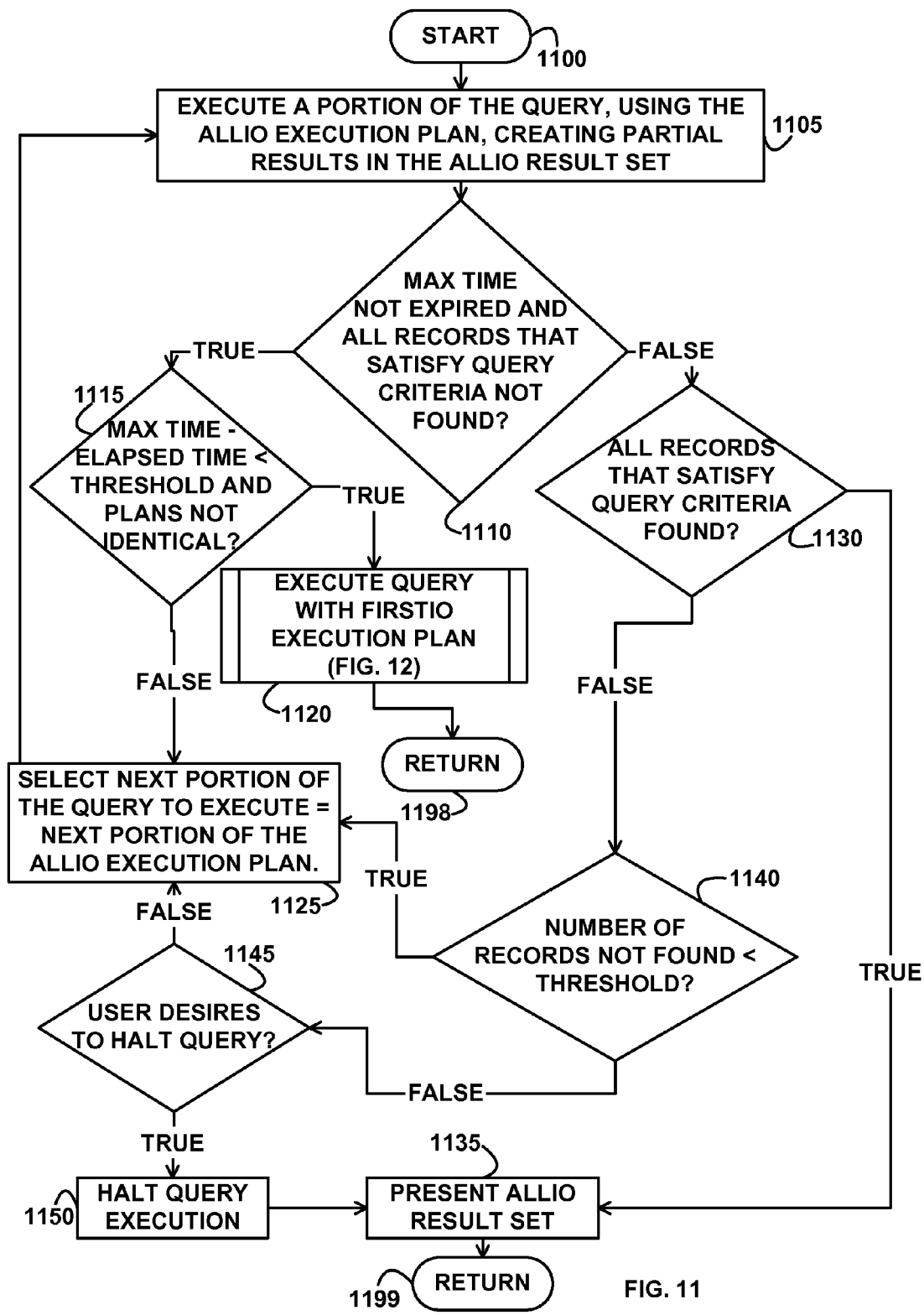
FIG. 11 depicts a flowchart of example processing for executing a query initially with an ALLIO execution plan, according to an embodiment of the invention.

FIG. 11 depicts a flowchart of example processing for executing a query initially with an ALLIO execution plan, according to an embodiment of the invention. Control begins at block 1100. Control then continues to block 1105 where the DBMS 150 executes a portion of the query 158 using the ALLIO execution plan. The DBMS 150 stores records in the ALLIO result set 154 that results from the execution of the portion of the ALLIO execution plan. In an embodiment, the DBMS 150 selects a portion of the query 158 by selecting a certain number or percentage of the records (which is less than the total number or percentage of records) to read from the first table in the join order. During every execution of the loop that starts at block 1105, the DBMS 150 reads a different portion of the records from the first table in the join order. Control then continues to block 1110 where the DBMS 150 determines whether the maximum time has not expired and all records that satisfy the criteria of the query 158 have not been found. That is, the DBMS 150 determines whether the elapsed time since execution of the query 158 was received exceeds the maximum time and the DBMS 150 has not yet found all of the records from the database tables that satisfy the query criteria.

If the determination at block 1110 is true, then the maximum time has not expired and all records that satisfy the query 158 have not been found, so control continues to block 1115 where the DBMS 150 determines whether the maximum time minus the elapsed time since the query 158 was received is less than a threshold and the FIRSTIO and ALLIO execution plans are not identical. If the determination at block 1115 is true, then the maximum time minus the elapsed time since the query 158 was received from the application is less than a threshold and the FIRSTIO and ALLIO execution plans are not identical, so control continues to block 1120 where the DBMS 150 stops executing the query 158 with the ALLIO execution plan and executes the query 158 with the FIRSTIO execution plan, as further described below with reference to FIG. 12. Thus, the time period expires in which the ALLIO execution plan is executed, and the FIRSTIO execution plan executes in a time period after the ALLIO execution plan. Control then continues to block 1198 where the logic of FIG. 11 returns.

If the determination at block 1115 is false, then the maximum time minus the elapsed time since the query 158 was received is greater than or equal to the threshold or the FIRSTIO and ALLIO execution plans are identical, so control continues to block 1125 where the DBMS 150 sets the next portion of the query 158 to execute to be the next unexecuted portion of the ALLIO execution plan. Control then returns to block 1105 where the DBMS 150 executes the next portion of the query 158 using the ALLIO execution plan, as previously described above. If the determination at block 1110 is false, then the maximum time has expired or all records that satisfy the query 158 have been found, so control continues to block 1130 where the DBMS 150 determines whether all records that satisfy the query criteria have been found. If the determination at block 1130 is true, then all records that satisfy the query criteria have been found, so control continues to block 1135 where the DBMS 150 presents or displays the ALLIO result 154 set via the user I/O device 121. Control then continues to block 1199 where the logic of FIG. 11 returns.

If the determination at block 1130 is false, then the maximum time has expired and all records that satisfy the query criteria have not been found, so control continues to block 1140 where the DBMS 150 determines whether the number of records that have not been found is less than a threshold number. If the determination at block 1140 is true, then the maximum time has expired, all records that satisfy the query criteria have not been found, and the number of records not found is less than a threshold number, so control continues to block 1125 where the DBMS 150 selects the next portion of the query 158 to execute using the ALLIO execution plan, as previously described above. Thus, if the number of records not found is less than the threshold, the execution of the ALLIO execution plan continues, even though the maximum time has expired.

If the determination at block 1140 is false, then the maximum time has expired, all records have not been found, and the number of records not found is greater than or equal to a threshold number, so control continues to block 1145 where the DBMS 150 determines whether the user requests to halt the query execution. In an embodiment, the DBMS 150 sends a confirmation message to the application that sent the query 158 or to the user I/O device and receives a response of a command that requests the query 158 to either halt or continue.

If the determination at block 1145 is true, then the user requests to halt the query execution, so control continues to block 1150 where the DBMS 150 halts execution of the query execution that uses the ALLIO execution plan (the time period during which the query executes ends or expires). Control then continues to block 1135 where the DBMS 150 presents or displays, via the user I/O device 121, the partial ALLIO result set 154 that the DBMS 150 retrieved from the database prior to the halt of the execution of the ALLIO execution plan. Control then continues to block 1199 where the logic of FIG. 11 returns. If the determination at block 1145 is false, then the user requests execution of the ALLIO execution plan to continue even though the maximum time has expired, so control continues to block 1125, as previously described above.

Figure 12:
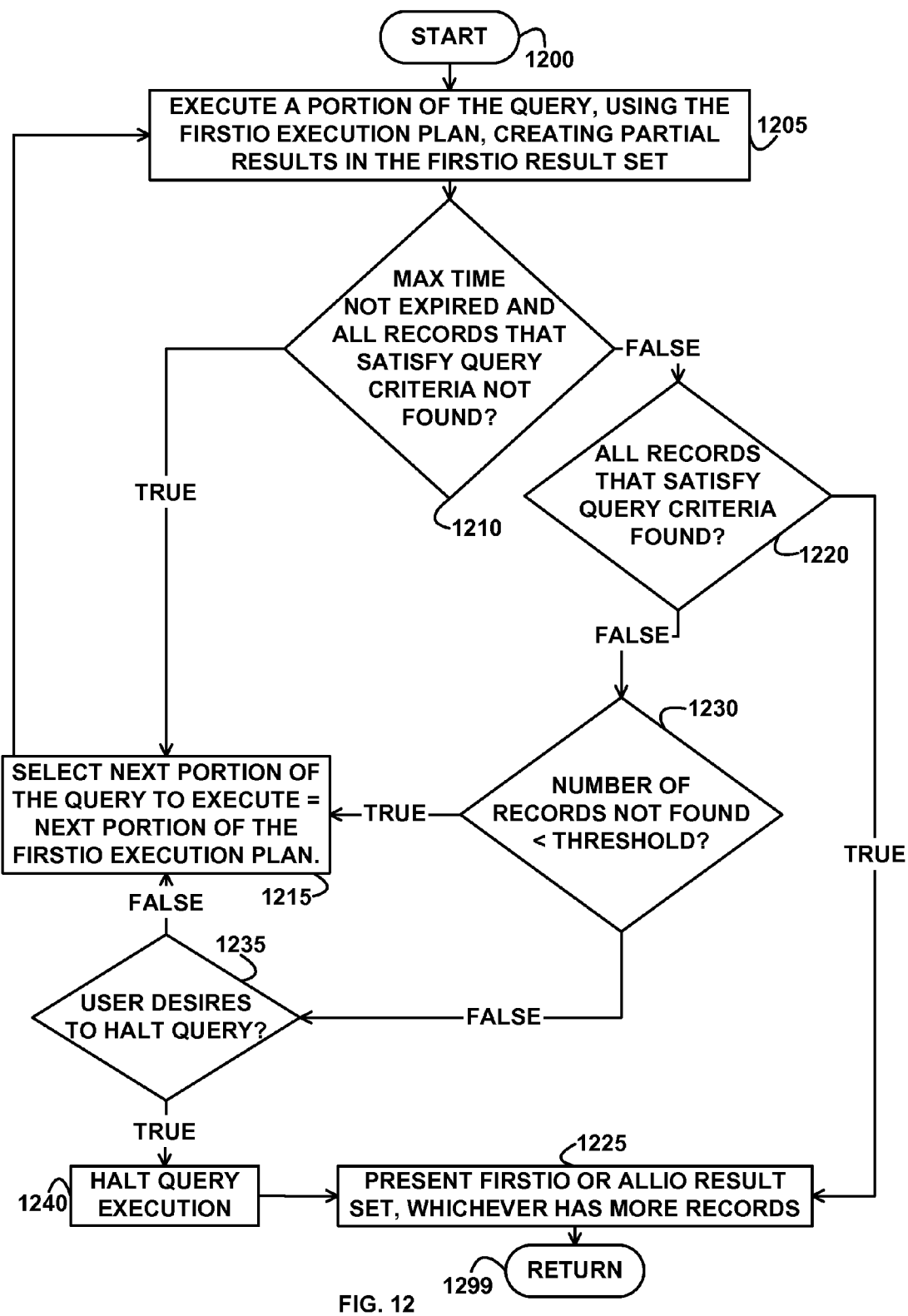
FIG. 12 depicts a flowchart of example processing for executing a query with a FIRSTIO execution plan, according to an embodiment of the invention.

FIG. 12 depicts a flowchart of example processing for executing a query with a FIRSTIO execution plan, according to an embodiment of the invention. Control begins at block 1200. Control then continues to block 1205 where the DBMS 150 executes a portion of the query 158 using the FIRSTIO execution plan. The DBMS 150 stores records in the FIRSTIO result set 156 that result from the execution of the portion of the FIRSTIO execution plan. In an embodiment, the DBMS 150 selects a portion of the query 158 by selecting a certain number or percentage of the records (which is less than the total number or percentage of records) to read from the first table in the join order. During every execution of the loop that starts at block 1205, the DBMS 150 reads a different portion of the records from the first table in the join order. Control then continues to block 1210 where the DBMS 150 determines whether the maximum time has not expired and all records in the database tables that satisfy the query criteria have not been found. If the determination at block 1210 is true, then the maximum time has not expired and execution of the FIRSTIO execution plan has not found all records that satisfy the query 158, so control continues to block 1215 where the DBMS 150 sets the next portion of the query 158 to execute to be the next unexecuted portion of the FIRSTIO execution plan. Control then returns to block 1205 where the DBMS 150 executes the next portion of the query 158, as previously described above.

If the determination at block 1210 is false, then the maximum time has expired or execution of the FIRSTIO execution plan has found all records that satisfy the query 158, so control continues to block 1220 where the DBMS 150 determines whether all records that satisfy the query criteria have been found. If the determination at block 1220 is true, then all records that satisfy the query criteria have been found, so control continues to block 1225 where the DBMS 150 presents or displays the FIRSTIO result set or the ALLIO result set, whichever has more records, via the user I/O device. In an embodiment, if the FIRSTIO result set and the ALLIO result set have the same number of records, the DBMS 150 presents the ALLIO result set. In an embodiment, if the FIRSTIO result set and the ALLIO result set have the same number of records, the DBMS 150 presents the FIRSTIO result set. The DBMS 150 discards the result set that has fewer records and does not present or display it. Control then continues to block 1299 where the logic of FIG. 12 returns.

If the determination at block 1220 is false, then the maximum time has expired and all records that satisfy the query criteria have not been found, so control continues to block 1230 where the DBMS 150 determines whether the number of records that have not been found is less than a threshold number. If the determination at block 1230 is true, then the maximum time has expired, all records that satisfy the query criteria have not been found, and the number of records not found is less than a threshold number, so control continues to block 1215 where the DBMS 150 selects the next portion of the query 158 to execute using the FIRSTIO execution plan, as previously described above. Thus, if the number of records not found is less than the threshold, the query execution continues, even though the maximum time has expired.

If the determination at block 1230 is false, then the maximum time has expired, all records that satisfy the query criteria have not been found, and the number of records not found is greater than or equal to a threshold number, so control continues to block 1235 where the DBMS 150 determines whether the user requests to halt the query execution. In an embodiment, the DBMS 150 sends a confirmation message to the application that sent the query 158 or to the user I/O device and receives a response of a command that requests the query 158 to halt or continue. If the determination at block 1235 is true, then the user requests to halt the query execution, so control continues to block 1240 where the DBMS 150 halts the query execution of the FIRSTIO execution plan (the time period ends during which the FIRSTIO execution plan executes). Control then continues to block 1225 where the DBMS 150 presents or displays, via the user I/O device, the partial FIRSTIO result set or the partial ALLIO result set, whichever has more records and discards and does not present the result set with fewer records. Control then continues to block 1299 where the logic of FIG. 12 returns. If the determination at block 1235 is false, then the user requests execution of the query 158 to continue even though the maximum time has expired, so control continues to block 1215, as previously described above.

Figure 13:
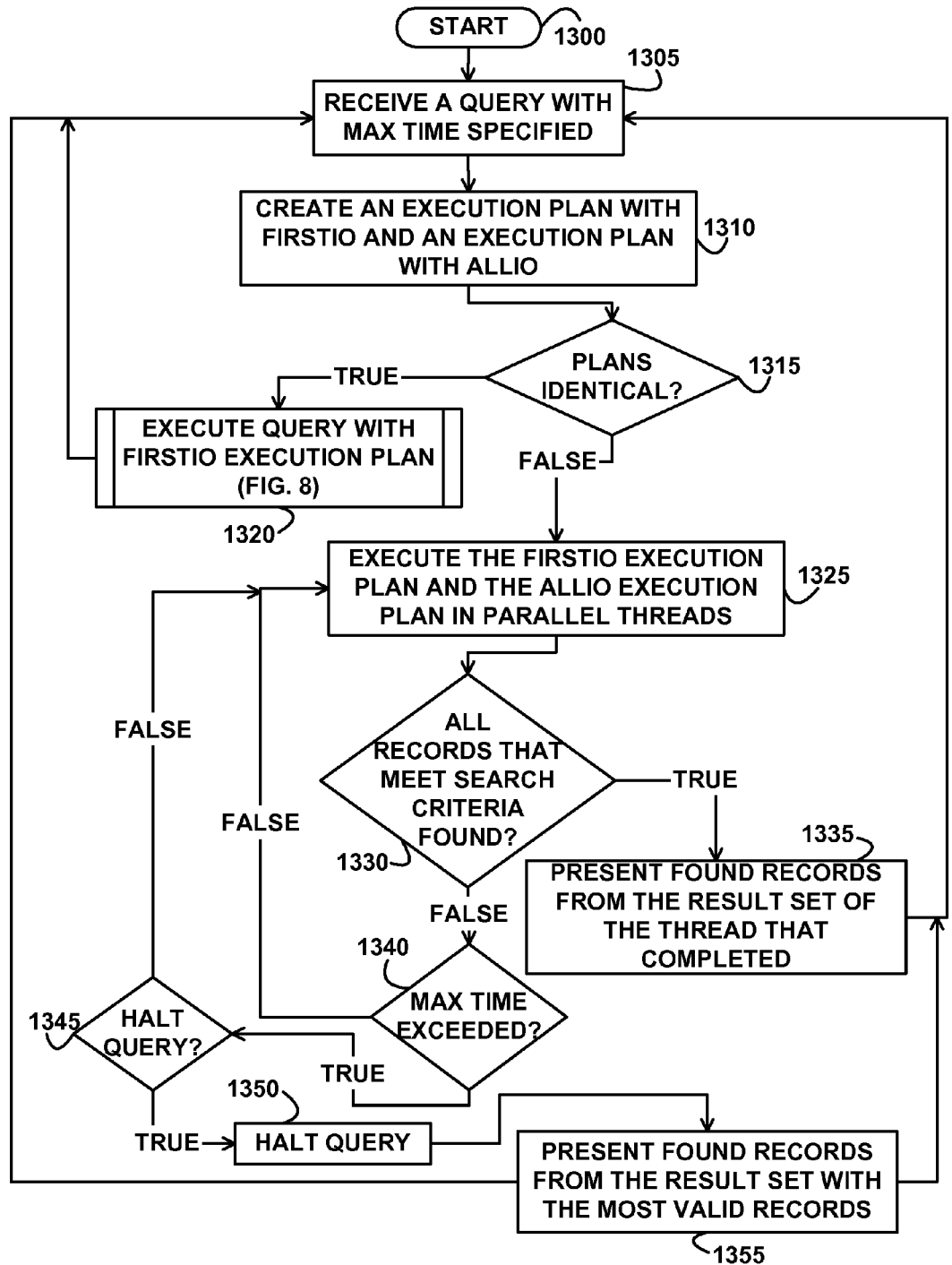
FIG. 13 depicts a flowchart of example processing for executing a query with a FIRSTIO and ALLIO execution plans in parallel, according to an embodiment of the invention.

FIG. 13 depicts a flowchart of example processing for executing a query with a FIRSTIO and ALLIO execution plans in parallel, according to an embodiment of the invention. Control begins at block 1300. Control then continues to block 1305 where the DBMS 150 receives a query 158 from an application that specifies a maximum amount of time that the query 158 is allowed to execute. Control then continues to block 1310 where the DBMS 150 creates a FIRSTIO execution plan and an ALLIO execution plan. Control then continues to block 1315 where the DBMS 150 determines whether the FIRSTIO execution plan is identical to the ALLIO execution plan. If the determination at block 1315 is true, then the FIRSTIO execution plan is identical to the ALLIO execution plan, so control continues to block 1320 where the DBMS 150 executes the query 158 with the FIRSTIO execution plan. Control then returns to block 1305 where the DBMS 150 receives the same or a different query from the same or a different application, as previously described above.

If the determination at block 1315 is false, then the FIRSTIO and ALLIO execution plans are not identical, so control continues to block 1325 where the DBMS 150 concurrently executes a portion of the FIRSTIO execution plan and a portion of the ALLIO execution plan in parallel threads. That is, the time periods of the execution of the FIRSTIO execution plan and the ALLIO execution plan are identical or overlap (the end of one time period is between the start and end of the other time period).

Control then continues to block 1330 where the DBMS 150 determines whether execution of the FIRSTIO execution plan or the ALLIO execution plan found all records that meet the search criteria. If the determination at block 1330 is true, then execution of the FIRSTIO execution plan or the ALLIO execution plan found all records that meet the search criteria, so execution of the FIRSTIO and ALLIO execution is stopped (the time periods in which they execute expire) so control continues to block 1335 where the DBMS 150 presents or displays the found records from the result set of the thread that completed, stops execution of the thread that did not complete and discards the partial result set of the thread that did not complete. Control then returns to block 1305 where the DBMS 150 receives the same or a different query from the same or a different application, as previously described above.

If the determination at block 1330 is false, then neither of the threads has found all of the records that satisfy the query criteria, so control continues to block 1340 where the DBMS 150 determines whether the elapsed time since the query 158 was received exceeds the maximum time. If the determination at block 1340 is true, then the elapsed time since the query 158 was received exceeds the maximum time, so control continues to block 1345 where the DBMS 150 determines whether the user requests to halt the query execution. In an embodiment, the DBMS 150 sends a confirmation message to the application that sent the query 158 or to the user I/O device and receives a response of a command that requests the query 158 to halt or continue.

If the determination at block 1345 is true, then the user requests to halt the query execution, so control continues to block 1350 where the DBMS 150 halts the query execution in both threads. Control then continues to block 1335 where the DBMS 150 presents or displays, via the user I/O device, the partial FIRSTIO result set or the partial ALLIO result set, whichever has the most valid records. In an embodiment, a record in the result set is invalid if the query 158 requested that the records in the result set be sorted and the DBMS 150 has not sorted the records because all of the records have not been found. If the query 158 does not specify that the result set be sorted or if the result set has been sorted, then all records in the result set are valid. Control then returns to block 1305, as previously described above. If the determination at block 1345 is false, then the user requests or consents that execution of the query 158 continue even though the maximum time has expired, so control returns to block 1325, as previously described above. If the determination at block 1340 is false, then the elapsed time since the query 158 was received does not exceed the maximum time, so control returns to block 1325 where the DBMS 150 continues executing the next portion of the FIRSTIO execution plan and the next portion of the ALLIO execution plan, in parallel, as previously described above.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A computer implemented method comprising:
   selecting a FIRST INPUT/OUTPUT execution plan from a plurality of execution plans that has a lowest estimated execution time for finding a number of records that satisfy a query and are simultaneously viewable;
   executing the FIRST INPUT/OUTPUT execution plan for a first time period to create a FIRST INPUT/OUTPUT result set, wherein the executing the FIRST INPUT/OUTPUT execution plan comprises executing for the first time period that is before the second time period if a maximum time that the query is to execute minus a FIRST INPUT/OUTPUT estimated time of execution of the FIRST INPUT/OUTPUT execution plan is greater than a first threshold and the FIRST INPUT/OUTPUT estimated time is less than an ALL INPUT/OUTPUT estimated time of execution of the ALL INPUT/OUTPUT execution plan;
   wherein the executing the FIRST INPUT/OUTPUT execution plan further comprises if the maximum time expired and all records that satisfy the query are not found, continuing the executing the FIRST INPUT/OUTPUT execution plan if a number of records not found by the executing the FIRST INPUT/OUTPUT execution plan is less than a second threshold;
   wherein the executing the FIRST INPUT/OUTPUT execution plan further comprises if the maximum time expired, all records that satisfy the query are not found, and the number of records not found by the executing the FIRST INPUT/OUTPUT execution plan is greater than the second threshold, then continue the executing FIRST INPUT/OUTPUT execution plan if a user consents;
   selecting an ALL INPUT/OUTPUT execution plan from the plurality of execution plans that has a lowest estimated execution time for finding all records that satisfy the query;
   executing the ALL INPUT/OUTPUT execution plan for a second time period to create an ALL INPUT/OUTPUT result set, wherein the executing the ALL INPUT/OUTPUT execution plan further comprises executing the ALL INPUT/OUTPUT execution plan if the maximum time minus an elapsed time since the query was received is less than a third threshold;
   wherein the executing the ALL INPUT/OUTPUT execution plan further comprises if the maximum time expired and all records that satisfy the query are not found, then continue the executing the ALL INPUT/OUTPUT execution plan if a number of records not found by the executing the ALL INPUT/OUTPUT execution plan is less than a fourth threshold;
   wherein the executing the ALL INPUT/OUTPUT execution plan further comprises if the maximum time expired, all records that satisfy the query are not found, and the number of records not found by the executing the ALL INPUT/OUTPUT execution plan is greater than the fourth threshold, then continuing the executing the ALL INPUT/OUTPUT execution plan if the user consents;
   displaying the FIRST INPUT/OUTPUT result set if the FIRST INPUT/OUTPUT result set comprises more records than the ALL INPUT/OUTPUT result set; and
   displaying the ALL INPUT/OUTPUT result set if the ALL INPUT/OUTPUT result set comprises more records than the FIRST INPUT/OUTPUT result set.

2. The computer implemented method of claim 1, wherein the executing the query with the FIRST INPUT/OUTPUT execution plan comprises probing a first table that is first in a first join order specified by the FIRST INPUT/OUTPUT execution plan via an index, wherein the executing the query with the ALL INPUT/OUTPUT execution plan further comprises scanning a second table that is first in a second join order specified by the ALL INPUT/OUTPUT execution plan.

3. The computer implemented method of claim 1, wherein the executing the FIRST INPUT/OUTPUT execution plan executes for the first time period that is after the second time period if a maximum time minus a FIRST INPUT/OUTPUT estimated time of execution of the FIRST INPUT/OUTPUT execution plan is not greater than a first threshold and the maximum time minus an ALL INPUT/OUTPUT estimated time of execution of the ALL INPUT/OUTPUT execution plan is greater than a fifth threshold.

4. The computer implemented method of claim 3, wherein the executing the FIRST INPUT/OUTPUT execution plan further comprises executing the FIRST INPUT/OUTPUT execution plan if the maximum time minus an elapsed time since the query was received is less than a sixth threshold;

wherein the executing the ALL INPUT/OUTPUT execution plan further comprises if the maximum time expired and all records that satisfy the query are not found, then continue the executing the ALL INPUT/OUTPUT execution plan if a number of records not found by the executing the ALL INPUT/OUTPUT execution plan is less than a seventh threshold; and wherein the executing the ALL INPUT/OUTPUT execution plan further comprises if the maximum time expired, all records that satisfy the query are not found, and the number of records not found by the executing the ALL INPUT/OUTPUT execution plan is greater than the eighth the seventh threshold then continue the executing the ALL INPUT/OUTPUT execution plan if a user consents.

5. The computer implemented method of claim 4, wherein the executing the FIRST INPUT/OUTPUT execution plan further comprises if the maximum time expired and all records that satisfy the query are not found, then continue the executing the FIRST INPUT/OUTPUT execution plan if a number of records not found by the executing the FIRST INPUT/OUTPUT execution plan is less than an eighth threshold; and wherein the executing the FIRST INPUT/OUTPUT execution plan further comprises if the maximum time expired, all records that satisfy the query are not found, and the number of records not found by the executing the FIRST INPUT/OUTPUT execution plan is less than the ninth threshold eighth threshold then continue the executing FIRST INPUT/OUTPUT execution plan if the user consents.

6. The computer implemented method of claim 1, wherein the executing the FIRST INPUT/OUTPUT execution plan executes for the first time period that is after the second time period if the FIRST INPUT/OUTPUT estimated time is not less than an ALL INPUT/OUTPUT estimated time of execution of the ALL INPUT/OUTPUT execution plan and a maximum time minus an ALL INPUT/OUTPUT estimated time of execution of the ALL INPUT/OUTPUT execution plan is greater than a first threshold.

7. The computer implemented method of claim 1, wherein the executing the FIRST INPUT/OUTPUT execution plan executes for the first time period that is after the second time period if the FIRST INPUT/OUTPUT estimated time is not less than an ALL INPUT/OUTPUT estimated time of execution of the ALL INPUT/OUTPUT execution plan and a maximum time minus an ALL INPUT/OUTPUT estimated time of execution of the ALL INPUT/OUTPUT execution plan is not greater than a fifth threshold, wherein the first time period expires in response to a number of records in the FIRST INPUT/OUTPUT result set exceeding a ninth threshold, wherein the second time period expires in response to the maximum time expiring.

8. The computer implemented method of claim 1, wherein the first time period overlaps the second time period.

9. A non transitory computer-readable storage medium encoded with instructions, wherein the instructions when executed comprise:

selecting a FIRST INPUT/OUTPUT execution plan from a plurality of execution plans that has a lowest estimated execution time for finding a number of records that satisfy a query and are simultaneously viewable;

executing the FIRST INPUT/OUTPUT execution plan for a first time period to create a FIRST INPUT/OUTPUT result set;

selecting an ALL INPUT/OUTPUT execution plan from the plurality of execution plans that has a lowest estimated execution time for finding all records that satisfy the query;

executing the ALL INPUT/OUTPUT execution plan for a second time period to create an ALL INPUT/OUTPUT result set, wherein the executing the FIRST INPUT/OUTPUT execution plan executes for the first time period that is before the second time period if a maximum time that the query is to execute minus a FIRST INPUT/OUTPUT estimated time of execution of the FIRST INPUT/OUTPUT execution plan is greater than a first threshold and the FIRST INPUT/OUTPUT estimated time is less than an ALL INPUT/OUTPUT estimated time of execution of the ALL INPUT/OUTPUT execution plan;

wherein the executing the FIRST INPUT/OUTPUT execution plan executes for the first time period that is after the second time period if the FIRST INPUT/OUTPUT estimated time is not less than the ALL INPUT/OUTPUT estimated time and the maximum time minus then ALL INPUT/OUTPUT estimated time is not greater than a fifth threshold, wherein the first time period expires in response to a number of records in the FIRST INPUT/OUTPUT result set exceeding a ninth threshold, wherein the second time period expires in response to the maximum time expiring;

wherein the executing the ALL INPUT/OUTPUT execution plan further comprises executing the ALL INPUT/OUTPUT execution plan if the maximum time minus an elapsed time since the query was received is less than a third threshold;

wherein the executing the FIRST INPUT/OUTPUT execution plan further comprises if the maximum time expired and all records that satisfy the query are not found, then continue the executing the FIRST INPUT/OUTPUT execution plan if a number of records not found by the executing the FIRST INPUT/OUTPUT execution plan is less than a second threshold;

wherein the executing the FIRST INPUT/OUTPUT execution plan further comprises f the maximum time expired, all records that satisfy the query are not found, and the number of records not found by the executing the FIRST INPUT/OUTPUT execution plan is greater than the second threshold, then continue the executing FIRST INPUT/OUTPUT execution plan if a user consents;

displaying the FIRST INPUT/OUTPUT result set if the FIRST INPUT/OUTPUT result set comprises more records than the ALL INPUT/OUTPUT result set; and displaying the ALL INPUT/OUTPUT result set if the ALL INPUT/OUTPUT result set comprises more records than the FIRST INPUT/OUTPUT result set.

10. The non transitory computer-readable storage medium of claim 9, wherein the executing the FIRST INPUT/OUTPUT execution plan further comprises probing a first table that is first in a first join order specified by the FIRST INPUT/OUTPUT execution plan via an index; and.

wherein the executing the ALL INPUT/OUTPUT execution plan further comprises scanning a second table that is first in a second join order specified by the ALL INPUT/OUTPUT execution plan.

11. The non transitory computer-readable storage medium of claim 9, wherein the executing the FIRST INPUT/OUTPUT execution plan executes for the first time period that is after the second time period if the maximum time minus the FIRST INPUT/OUTPUT estimated time is not greater than the first threshold and the maximum time minus the ALL INPUT/OUTPUT estimated time is greater than a fifth threshold; and wherein the executing the FIRST INPUT/OUTPUT execution plan executes for the first time period that is after the second time period if the FIRST INPUT/OUTPUT estimated time is not less than the ALL INPUT/OUTPUT estimated time and the maximum time minus the ALL INPUT/OUTPUT estimated time is greater than the first threshold.

12. The non transitory computer-readable storage medium of claim 11, wherein the executing the FIRST INPUT/OUTPUT execution plan further comprises executing the FIRST INPUT/OUTPUT execution plan if the maximum time minus an elapsed time since the query was received is less than a sixth threshold;

wherein the executing the ALL INPUT/OUTPUT execution plan further comprises if the maximum time expired and all records that satisfy the query are not found, then continue the executing the ALL INPUT/OUTPUT execution plan if a number of records not found by the executing the ALL INPUT/OUTPUT execution plan is less than a seventh threshold;

wherein the executing the ALL INPUT/OUTPUT execution plan further comprises if the maximum time expired, all records that satisfy the query are not found, and the number of records not found by the executing the ALL INPUT/OUTPUT execution plan is greater than the seventh threshold then continue the executing the ALL INPUT/OUTPUT execution plan if a user consents;

wherein the executing the FIRST INPUT/OUTPUT execution plan further comprises if the maximum time expired and all records that satisfy the query are not found, then continue the executing the FIRST INPUT/OUTPUT execution plan if a number of records not found by the executing the FIRST INPUT/OUTPUT execution plan is less than an eighth threshold; and wherein the executing the FIRST INPUT/OUTPUT execution plan further comprises if the maximum time expired, all records that satisfy the query are not found, and the number of records not found by the executing the FIRST INPUT/OUTPUT execution plan is less than the eighth threshold then continue the executing FIRST INPUT/OUTPUT execution plan if the user consents.

13. The non transitory computer-readable storage medium of claim 9, wherein the executing the ALL INPUT/OUTPUT execution plan further comprises if the maximum time expired and all records that satisfy the query are not found, then continue the executing the ALL INPUT/OUTPUT execution plan if a number of records not found by the executing the ALL INPUT/OUTPUT execution plan is less than a fourth threshold; and wherein the executing the ALL INPUT/OUTPUT execution plan further comprises if the maximum time expired, all records that satisfy the query are not found, and the number of records not found by the executing the ALL INPUT/OUTPUT execution plan is greater than the sixth threshold fourth threshold then continue the executing the ALL INPUT/OUTPUT execution plan if the user consents.

14. A computer system, comprising:

a processor; and memory communicatively coupled to the processor, wherein the memory is encoded with instructions that when executed on the processor comprise:

selecting a FIRST INPUT/OUTPUT execution plan from a plurality of execution plans that has a lowest estimated execution time for finding a number of records that satisfy a query and are simultaneously viewable, executing the FIRST INPUT/OUTPUT execution plan for a first time period to create a FIRST INPUT/OUTPUT result set, selecting an ALL INPUT/OUTPUT execution plan from the plurality of execution plans that has a lowest estimated execution time for finding all records that satisfy the query, executing the ALL INPUT/OUTPUT execution plan for a second time period to create an ALL INPUT/OUTPUT result set, wherein the executing the FIRST INPUT/OUTPUT execution plan executes for the first time period that is before the second time period if a maximum time that the query is to execute minus a FIRST INPUT/OUTPUT estimated time of execution of the FIRST INPUT/OUTPUT execution plan is greater than a first threshold and the FIRST INPUT/OUTPUT estimated time is less than an ALL INPUT/OUTPUT estimated time of execution of the ALL INPUT/OUTPUT execution plan, wherein the executing the FIRST INPUT/OUTPUT execution plan executes for the first time period that is after the second time period if the FIRST INPUT/OUTPUT estimated time is not less than the ALL INPUT/OUTPUT estimated time and the maximum time minus then ALL INPUT/OUTPUT estimated time is not greater than a fifth threshold, wherein the first time period expires in response to a number of records in the FIRST INPUT/OUTPUT result set exceeding a ninth threshold, wherein the second time period expires in response to the maximum time expiring, wherein the executing the ALL INPUT/OUTPUT execution plan further comprises executing the ALL INPUT/OUTPUT execution plan if the maximum time minus an elapsed time since the query was received is less than a third threshold, wherein the executing the FIRST INPUT/OUTPUT execution plan further comprises if the maximum time expired and all records that satisfy the query are not found, then continue the executing the FIRST INPUT/OUTPUT execution plan if a number of records not found by the executing the FIRST INPUT/OUTPUT execution plan is less than a second threshold, wherein the executing the FIRST INPUT/OUTPUT execution plan further comprises if the maximum time expired, all records that satisfy the query are not found, and the number of records not found by the executing the FIRST INPUT/OUTPUT execution plan is greater than the second threshold, then continue the executing FIRST INPUT/OUTPUT execution plan if a user consents, displaying the FIRST INPUT/OUTPUT result set if the FIRST INPUT/OUTPUT result set comprises more records than the ALL INPUT/OUTPUT result set, and displaying the ALL INPUT/OUTPUT result set if the ALL INPUT/OUTPUT result set comprises more records than the FIRST INPUT/OUTPUT result set.

15. The computer system of claim 14,
wherein the executing the FIRST INPUT/OUTPUT execution plan further comprises probing a first table that is first in a first join order specified by the FIRST INPUT/OUTPUT execution plan via an index; and
wherein the executing the ALL INPUT/OUTPUT execution plan further comprises scanning a second table that is first in a second join order specified by the ALL INPUT/OUTPUT execution plan.

16. The computer system of claim 14,
wherein the executing the FIRST INPUT/OUTPUT execution plan executes for the first time period that is after the second time period if the maximum time minus the FIRST INPUT/OUTPUT estimated time is not greater than the first threshold and the maximum time minus the ALL INPUT/OUTPUT estimated time is greater than a fifth threshold; and
wherein the executing the FIRST INPUT/OUTPUT execution plan executes for the first time period that is after the second time period if the FIRST INPUT/OUTPUT estimated time is not less than the ALL INPUT/OUTPUT estimated time and the maximum time minus the ALL INPUT/OUTPUT estimated time is greater than the first threshold.

* * * * *